US011020957B2

(12) United States Patent
Matsuda

(10) Patent No.: US 11,020,957 B2
(45) Date of Patent: Jun. 1, 2021

(54) PRODUCING METHOD OF BASE MEMBER PROVIDED WITH PRINTED LAYER AND BASE MEMBER PROVIDED WITH PRINTED LAYER

(71) Applicant: AGC Inc., Chiyoda-ku (JP)

(72) Inventor: Keisuke Matsuda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 7 days.

(21) Appl. No.: 15/980,804

(22) Filed: May 16, 2018

(65) Prior Publication Data

US 2018/0333948 A1 Nov. 22, 2018

(30) Foreign Application Priority Data

May 17, 2017 (JP) ............................ JP2017-098467

(51) Int. Cl.

| | |
|---|---|
| ***B32B 3/10*** | (2006.01) |
| ***B41F 15/08*** | (2006.01) |
| ***B41F 15/42*** | (2006.01) |
| ***B41M 1/40*** | (2006.01) |
| ***B41F 15/38*** | (2006.01) |
| ***B41M 1/12*** | (2006.01) |
| *B41M 1/34* | (2006.01) |
| *B41M 1/28* | (2006.01) |
| *B41M 1/30* | (2006.01) |

(52) U.S. Cl.
CPC .......... *B41F 15/0895* (2013.01); *B41F 15/38* (2013.01); *B41F 15/42* (2013.01); *B41M 1/12* (2013.01); *B41M 1/40* (2013.01); *B41M 1/28* (2013.01); *B41M 1/30* (2013.01); *B41M 1/34* (2013.01); *B41P 2200/40* (2013.01); *B41P 2215/50* (2013.01)

(58) Field of Classification Search
None
See application file for complete search history.

(56) References Cited

U.S. PATENT DOCUMENTS 8,561,535 B2 10/2013 Sabia et al.
2013/0323444 A1* 12/2013 Ehemann ................ C03C 3/083
428/34.4

FOREIGN PATENT DOCUMENTS

| | | |
|---|---|---|
| CN | 103332007 | 10/2013 |
| CN | 203496422 | 3/2014 |
| CN | 208855257 | 5/2019 |

* cited by examiner

*Primary Examiner* — Christopher M Polley
(74) *Attorney, Agent, or Firm* — Oblon, McClelland, Maier & Neustadt, L.L.P.

(57) ABSTRACT

A producing method of a base member provided with a printed layer, the method including: disposing a printing plate including a screen plate having an opening pattern and a frame body supporting the screen plate so that the printing plate is opposed to a printing target surface of the base member having at least one bent portion; disposing a squeegee so as to be opposed to a plate surface of the screen plate opposite to the base member; and forming the printed layer by extruding a printing material onto the printing target surface by the squeegee via the opening pattern of the screen plate in a state where the frame body is supported so as to be relatively movable with respect to the printing target surface in a normal direction of the printing target surface.

8 Claims, 20 Drawing Sheets

[Fig. 1]
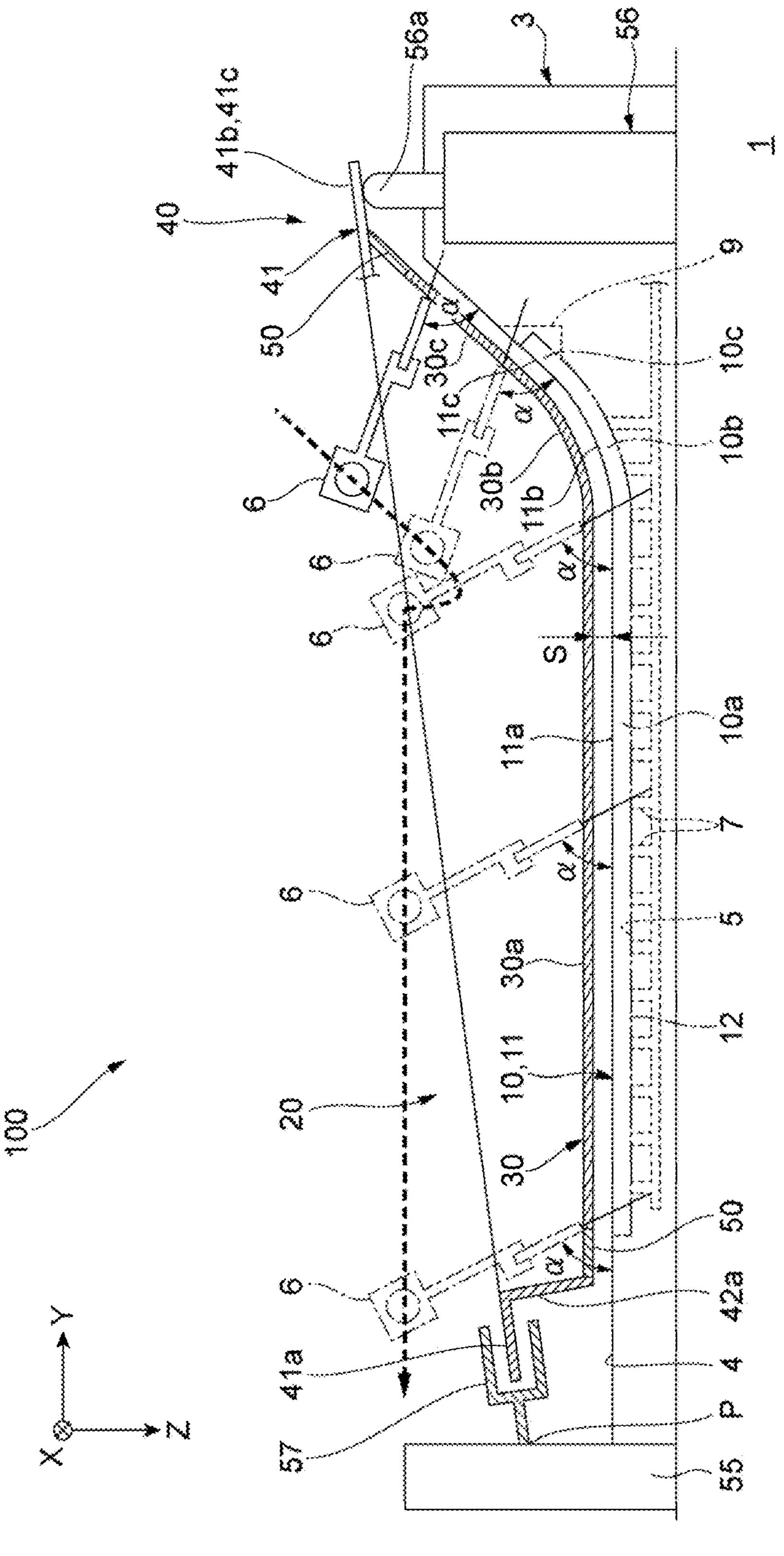

[Fig. 2]
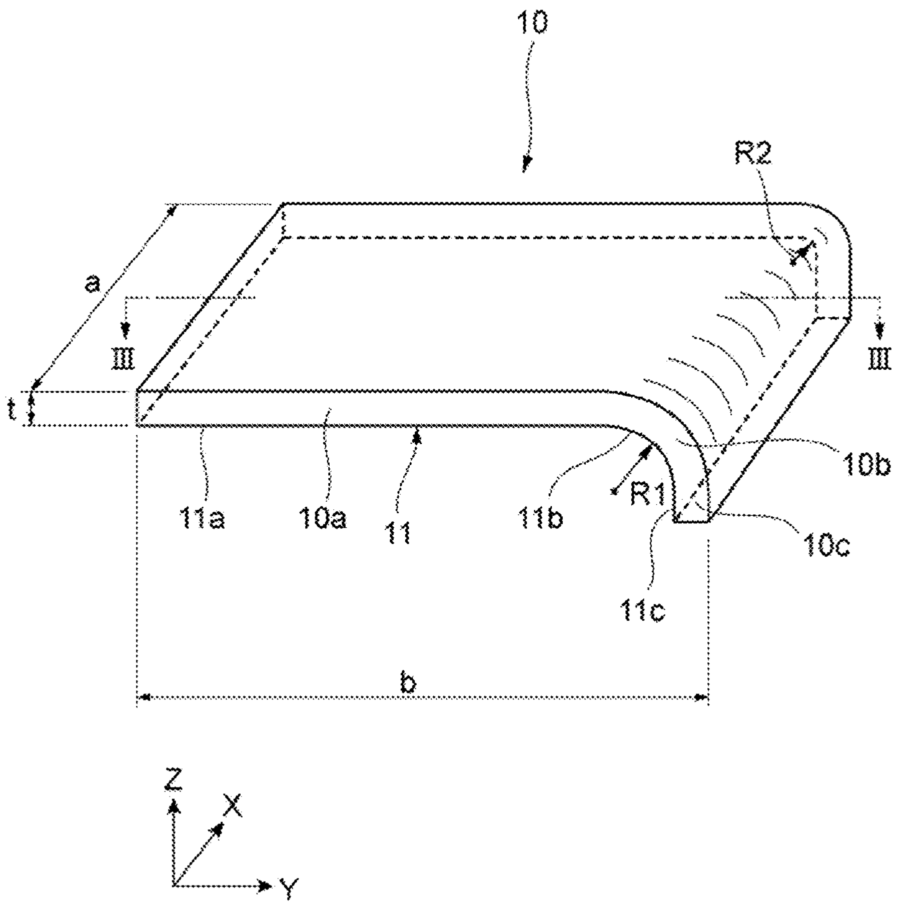

[Fig. 3]
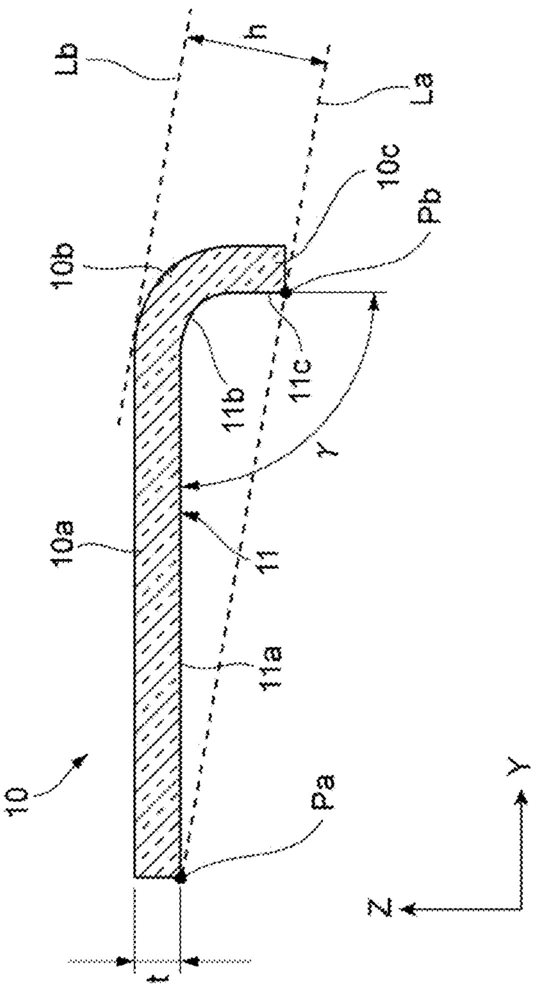

[Fig. 4]
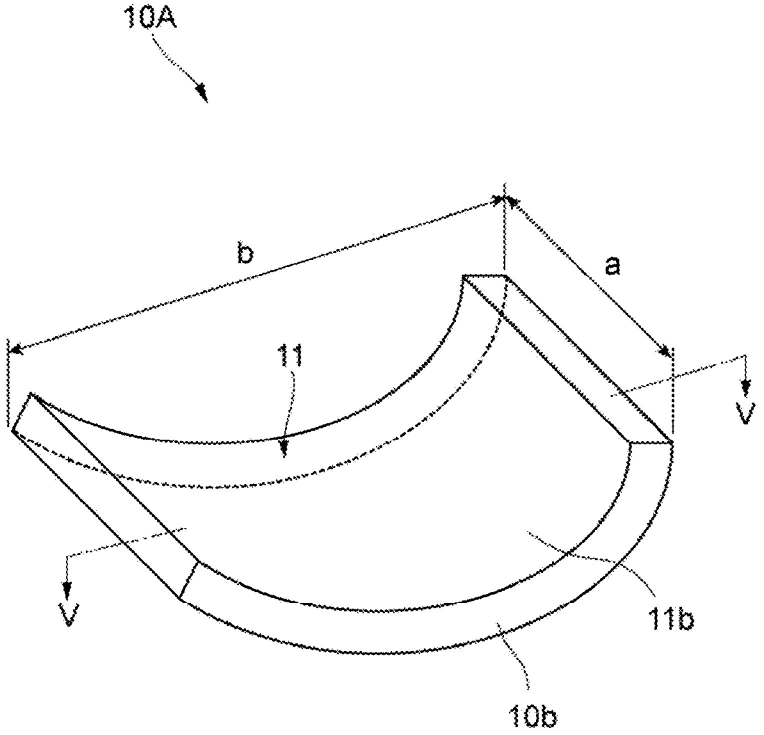

[Fig. 5]
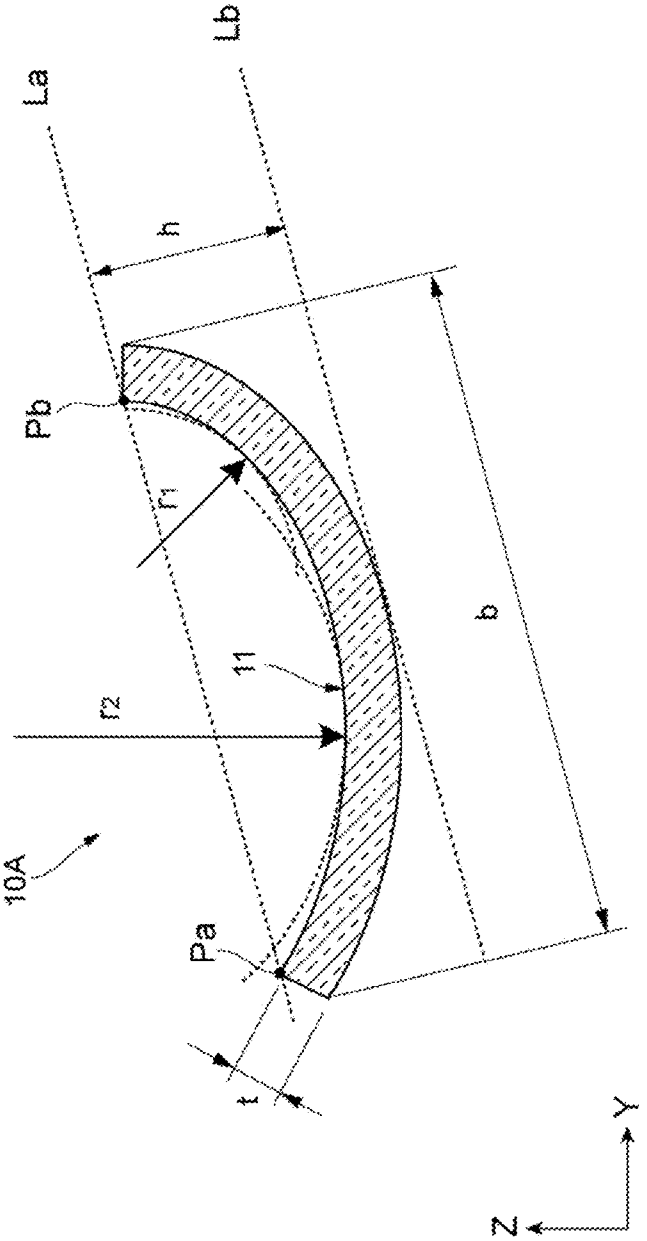

[Fig. 6]
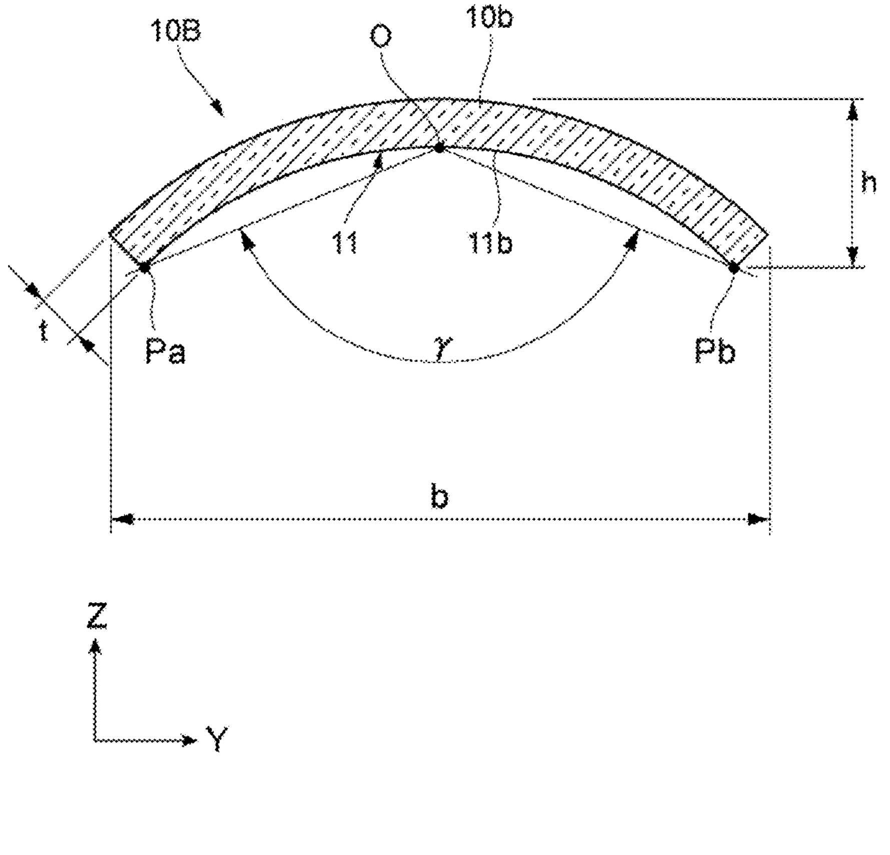

[Fig. 7]
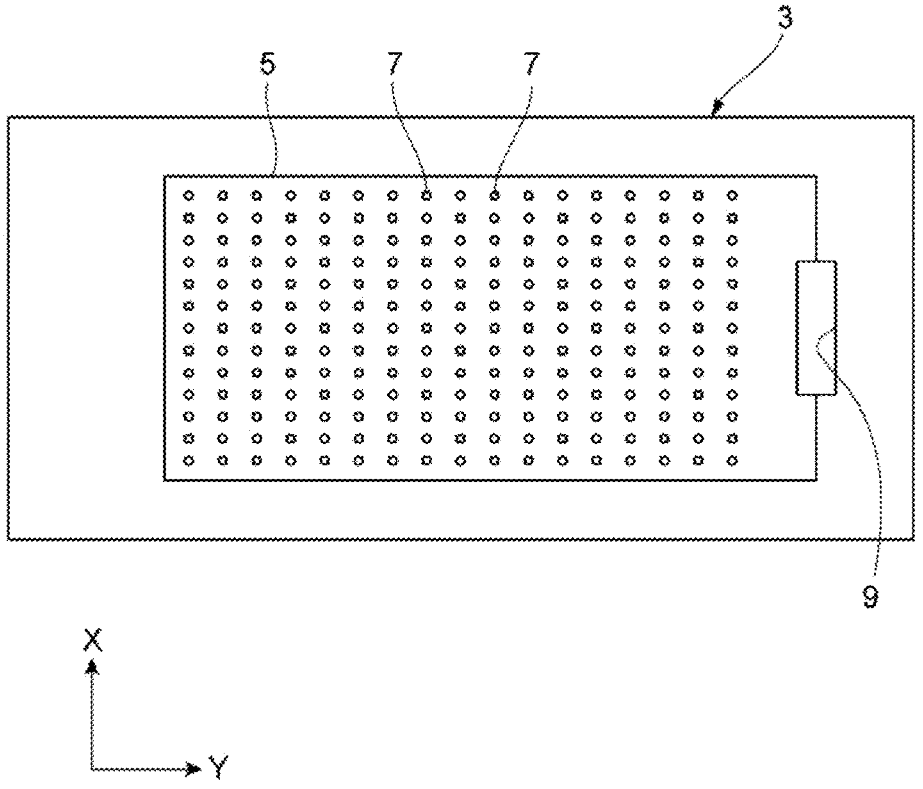

[Fig. 8]
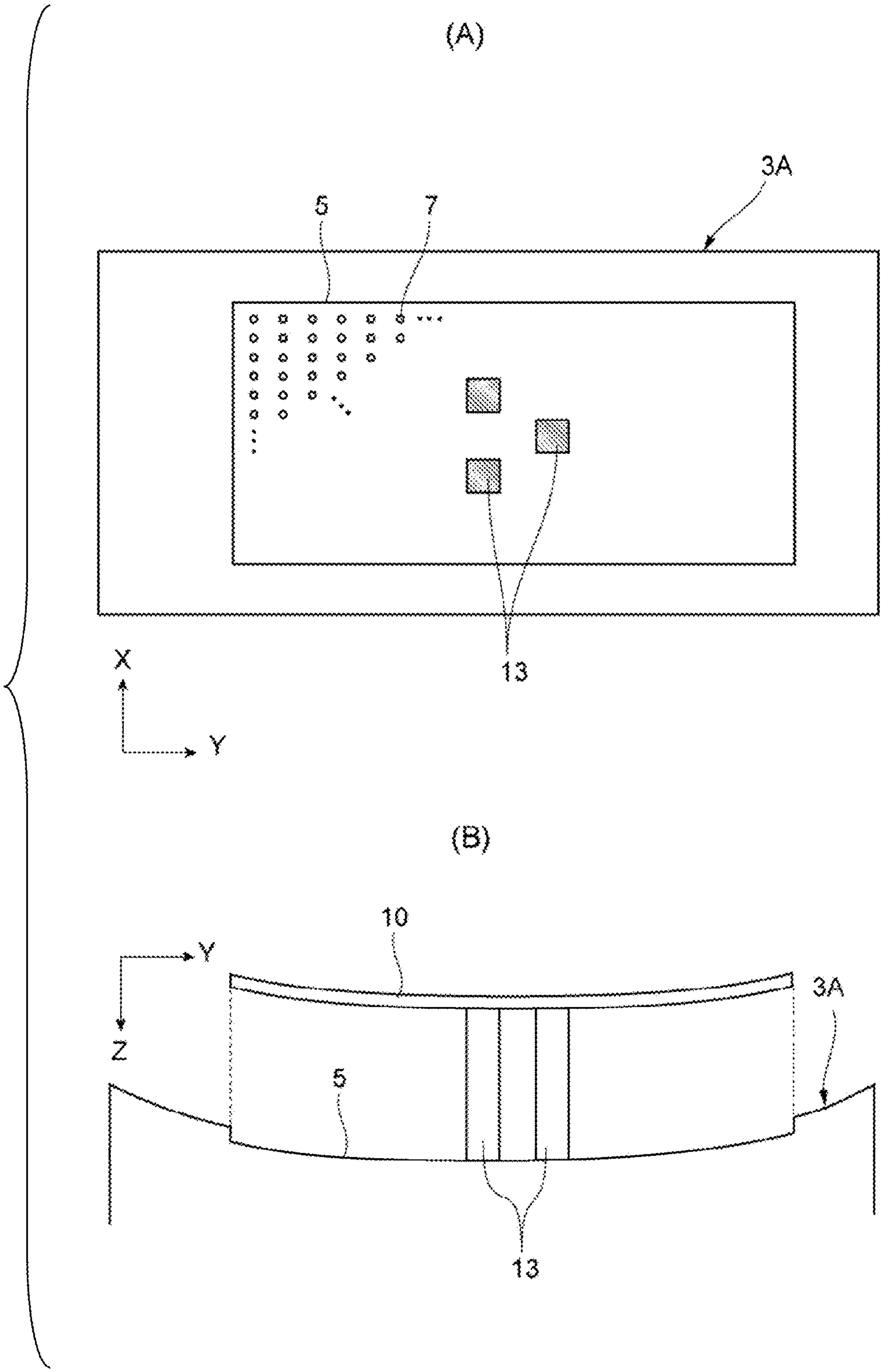

[Fig. 9]
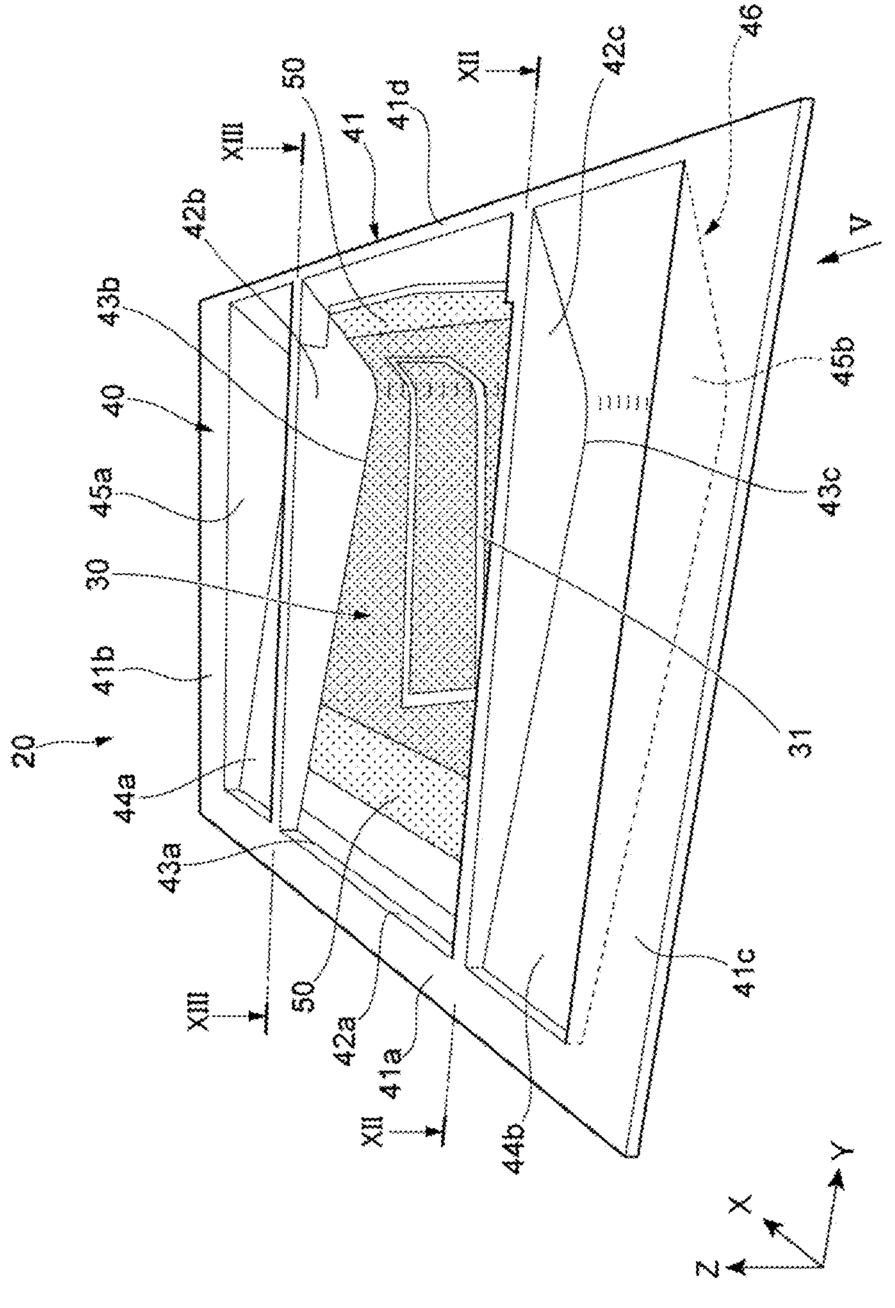

[Fig. 10]
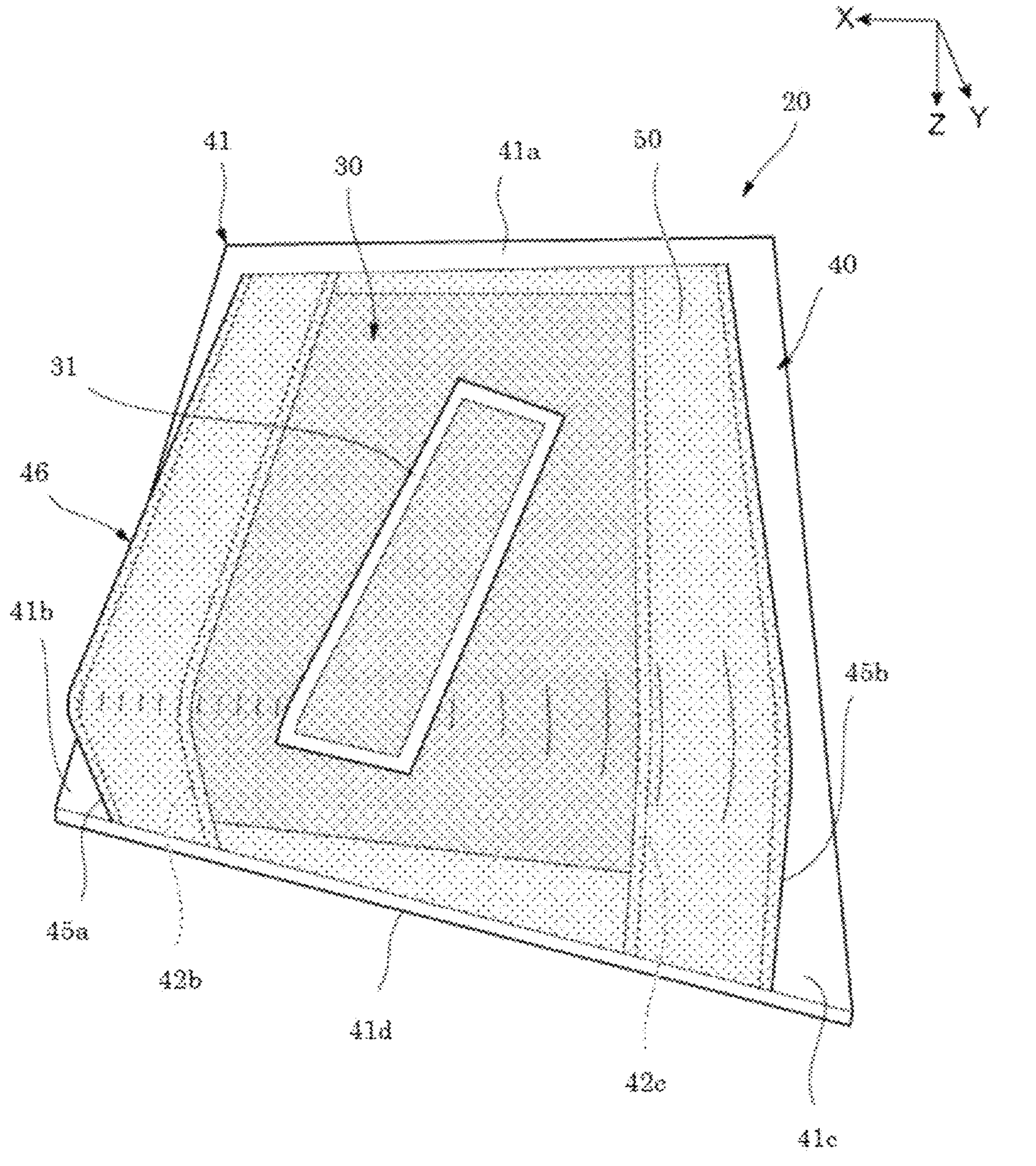

[Fig. 11]
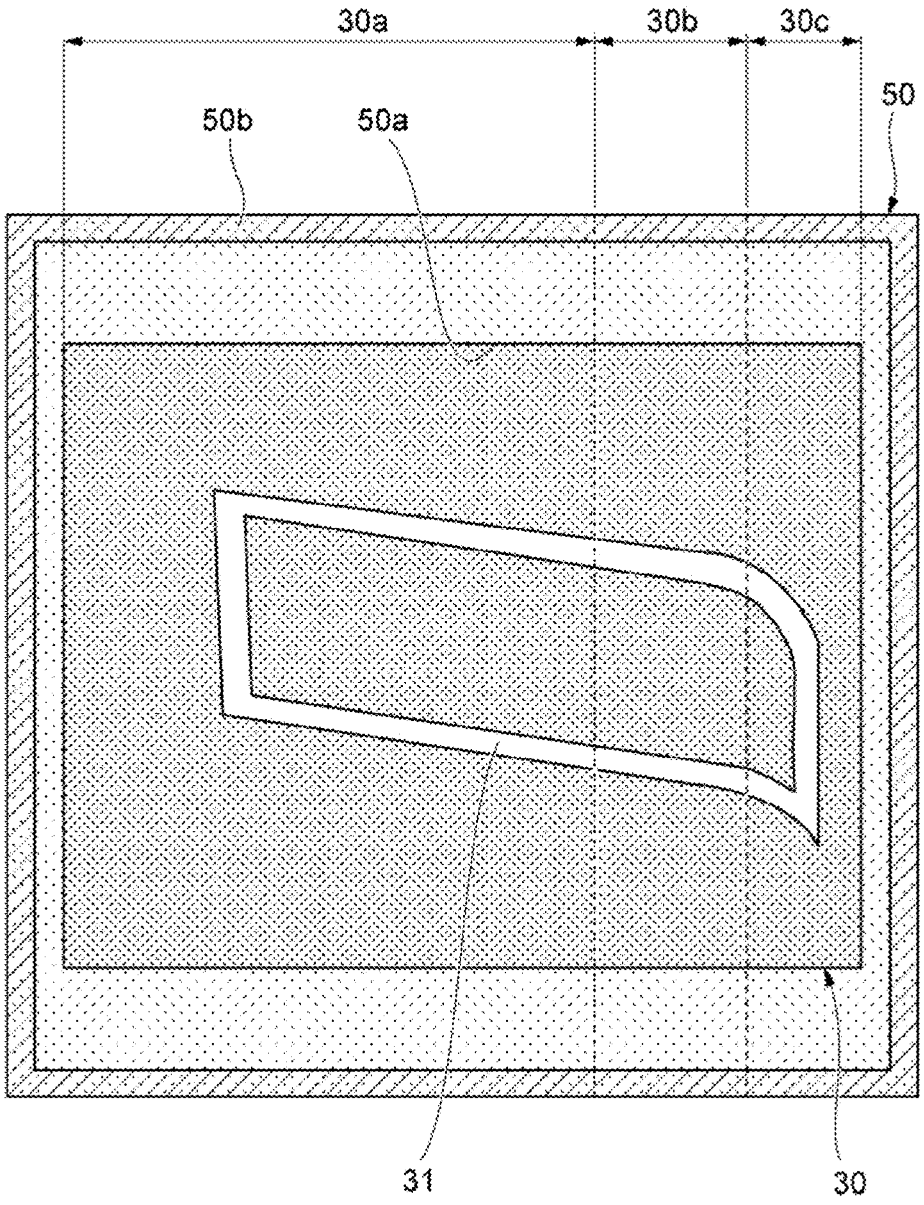

[Fig. 12]
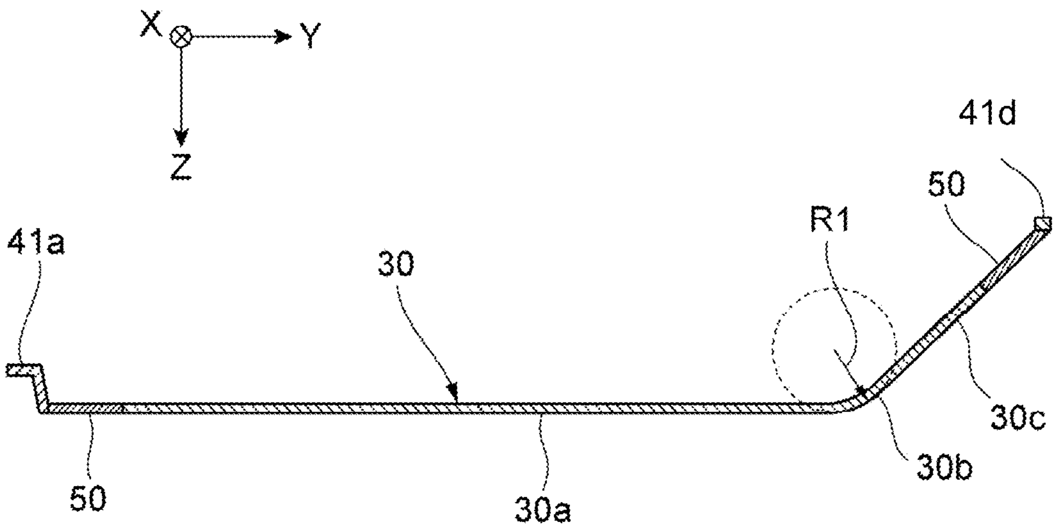
[Fig. 13]
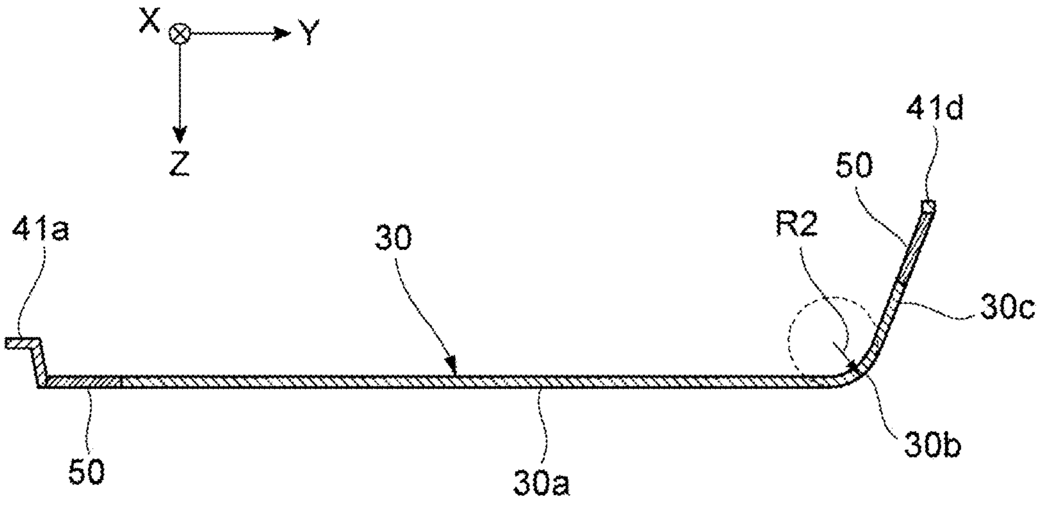

[Fig. 14]
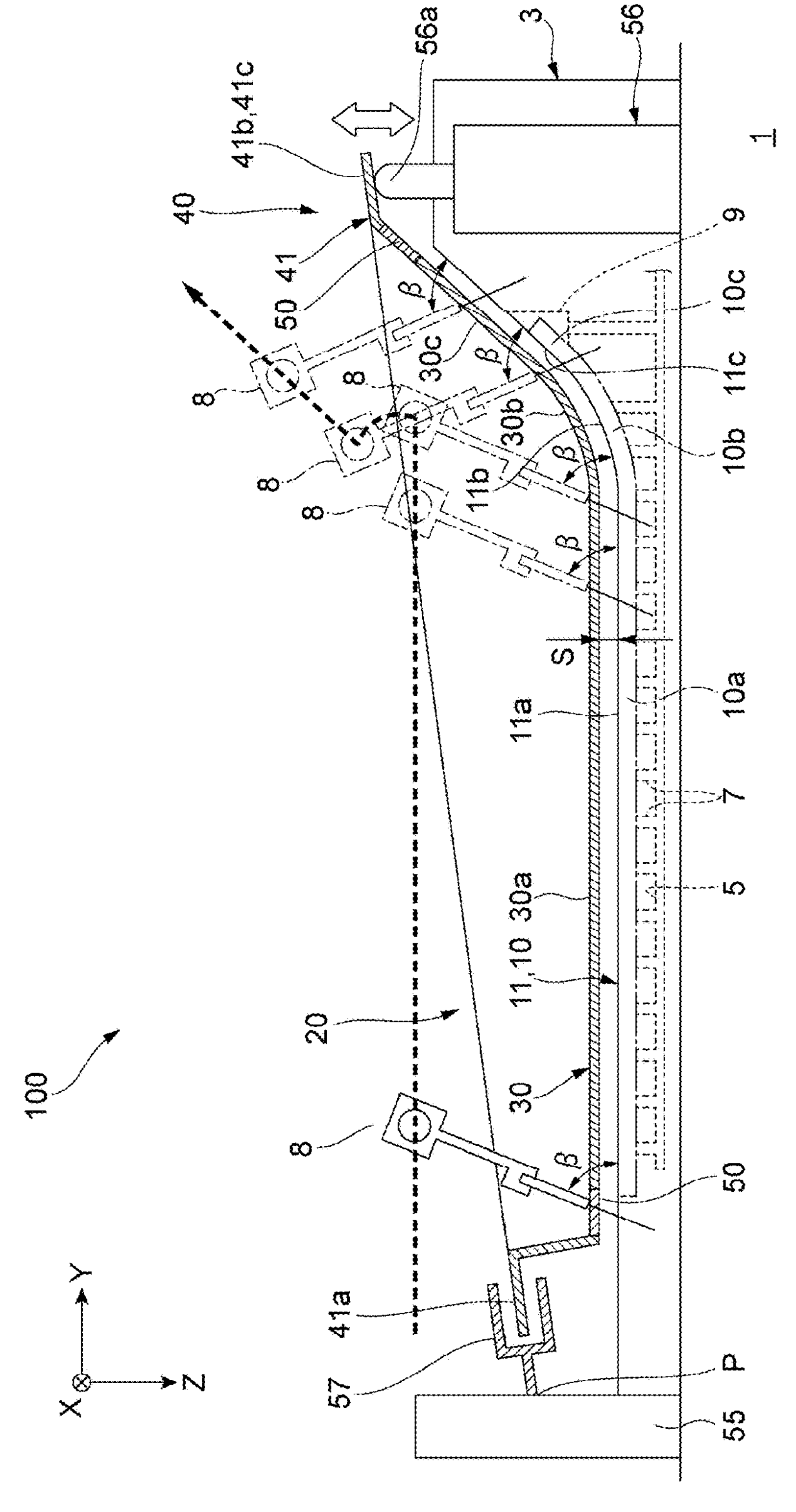

[Fig. 15]
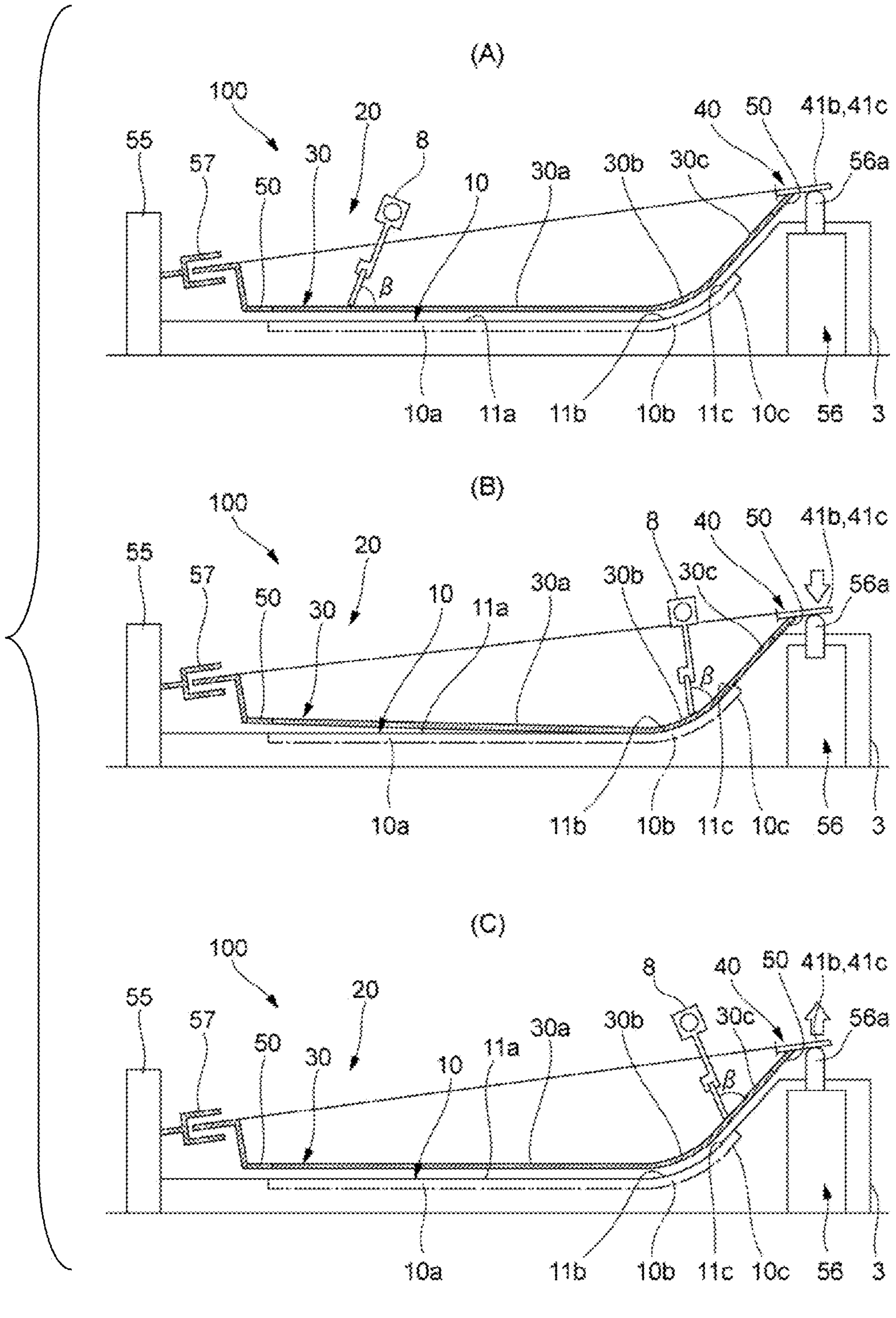

[Fig. 16]
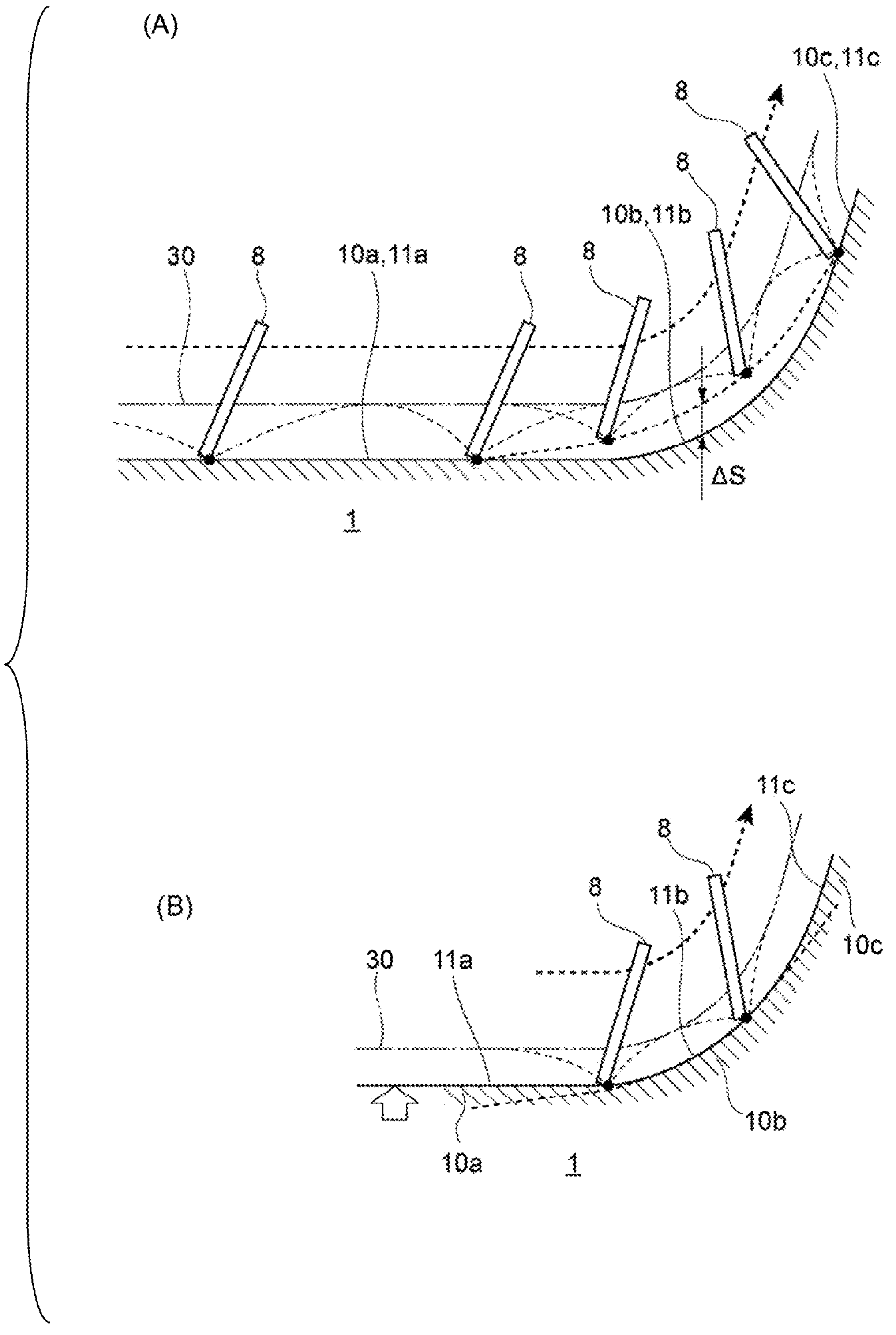

[Fig. 17]
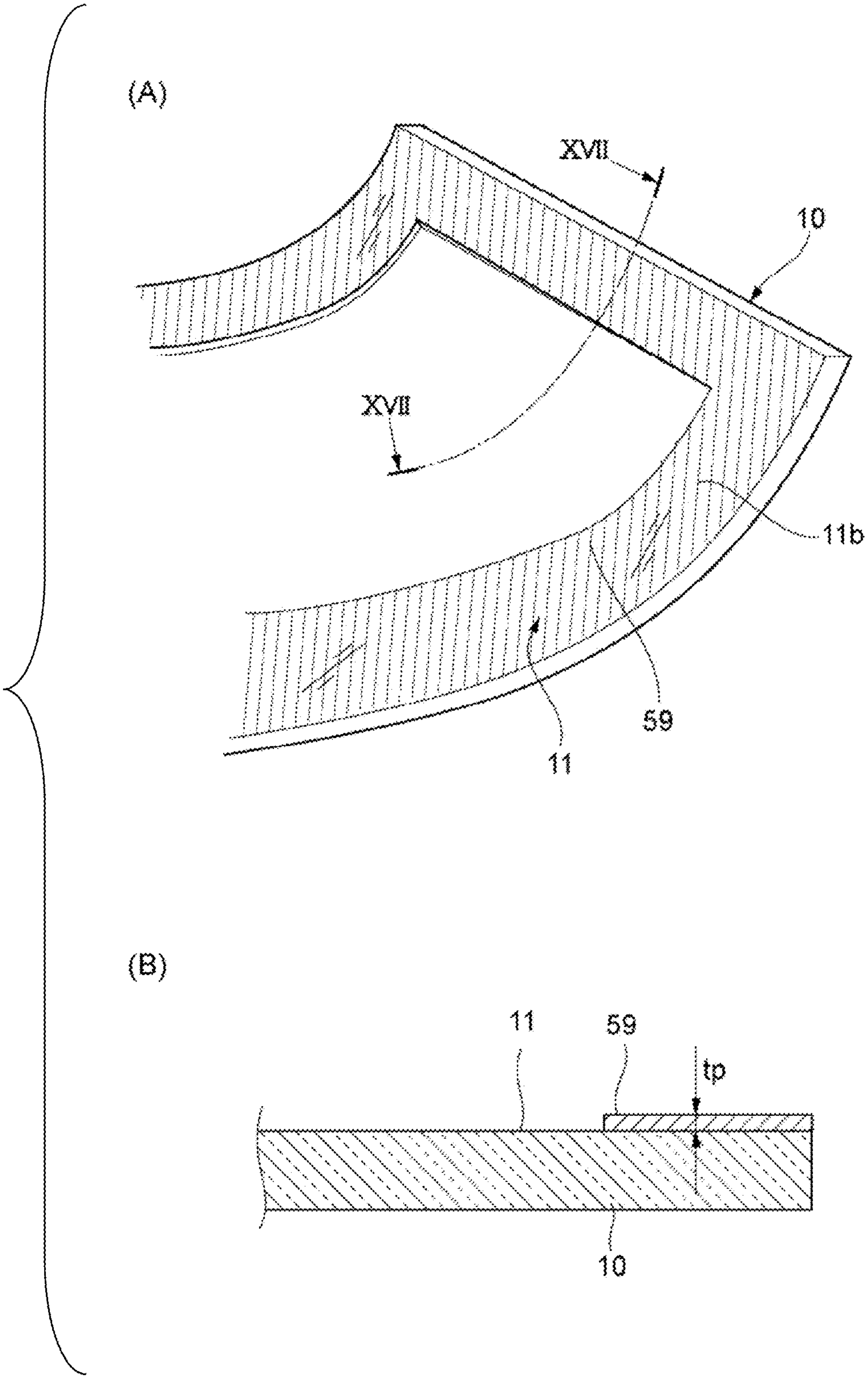

[Fig. 18]
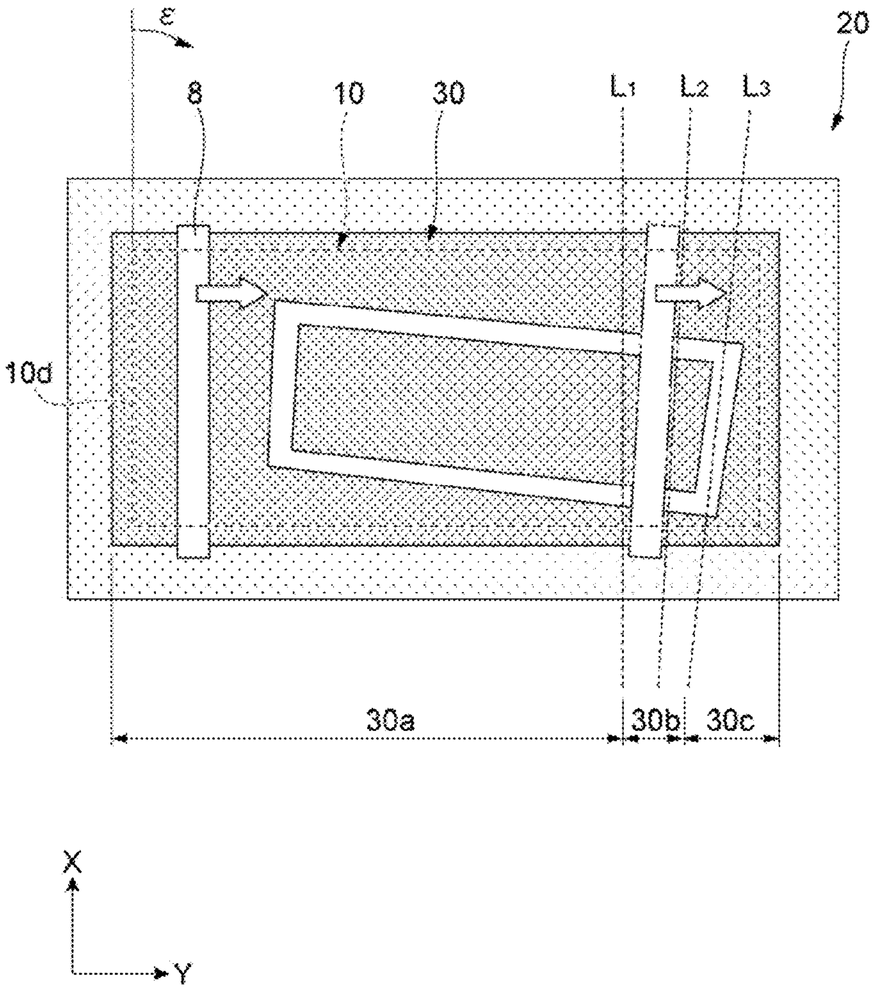

[Fig. 19]
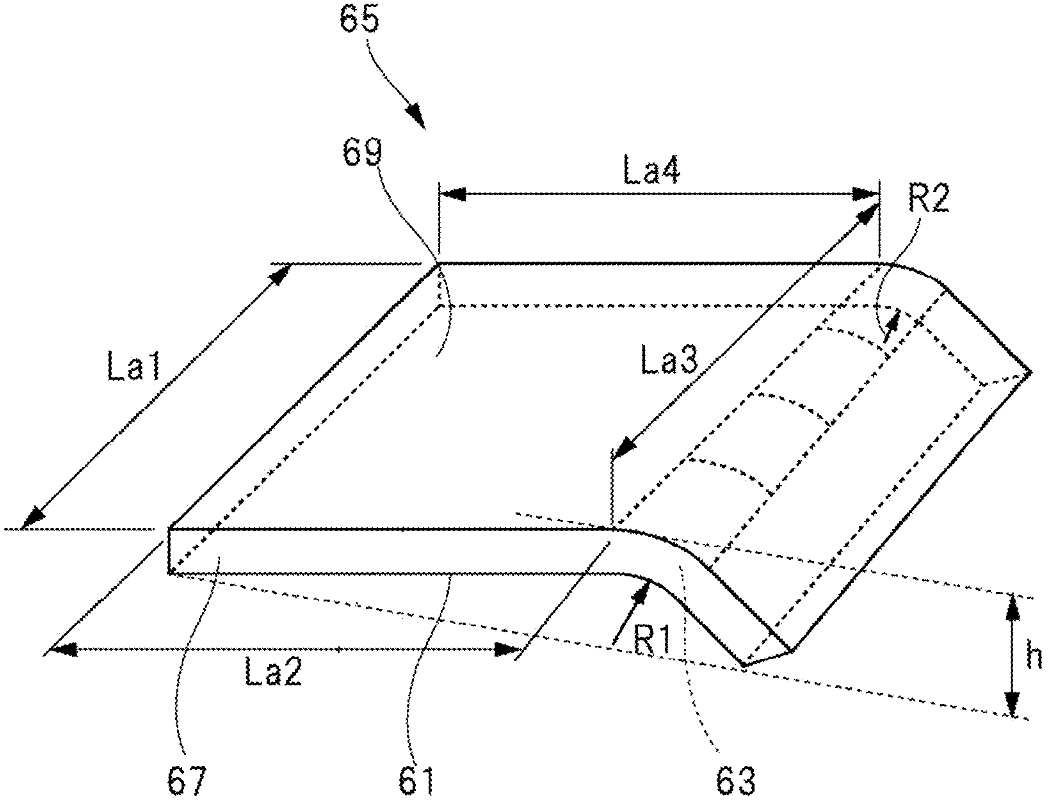

[Fig. 20]
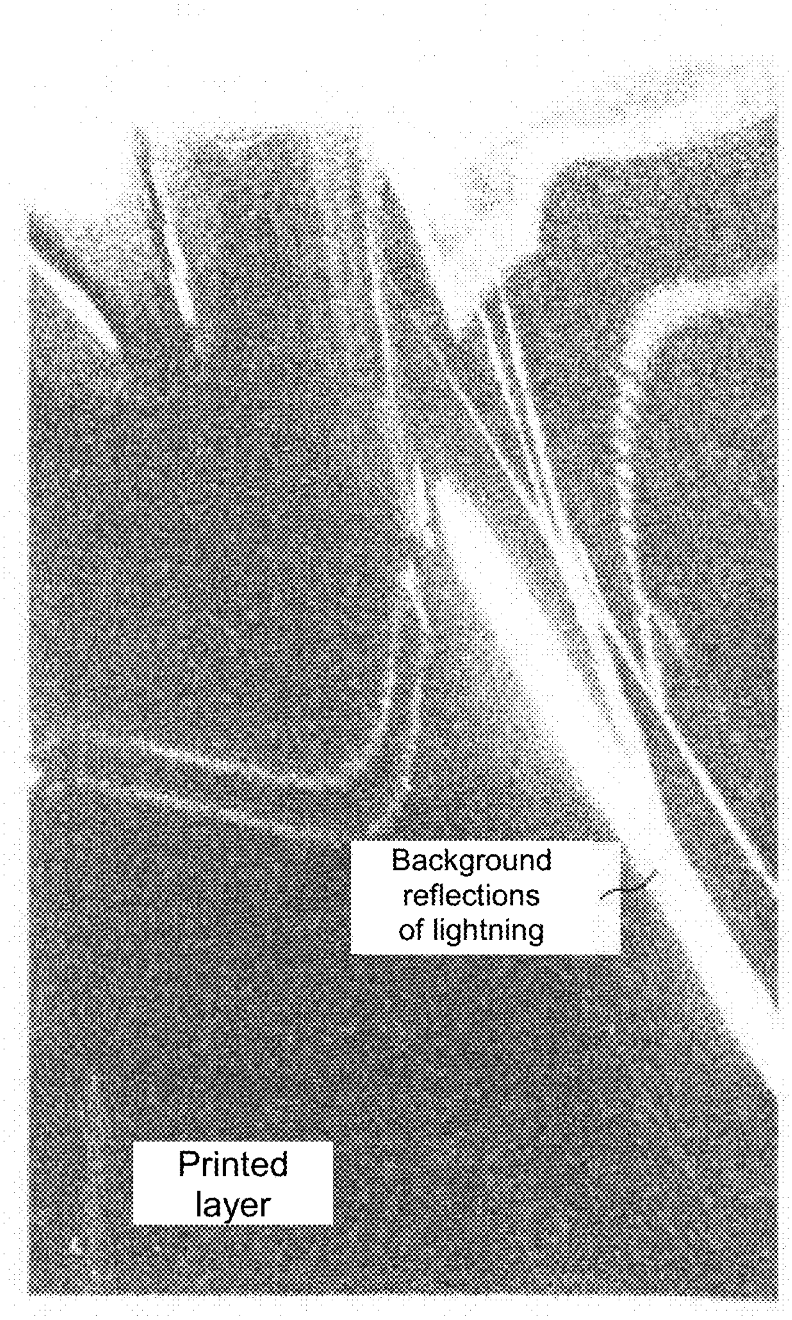

[Fig. 21]
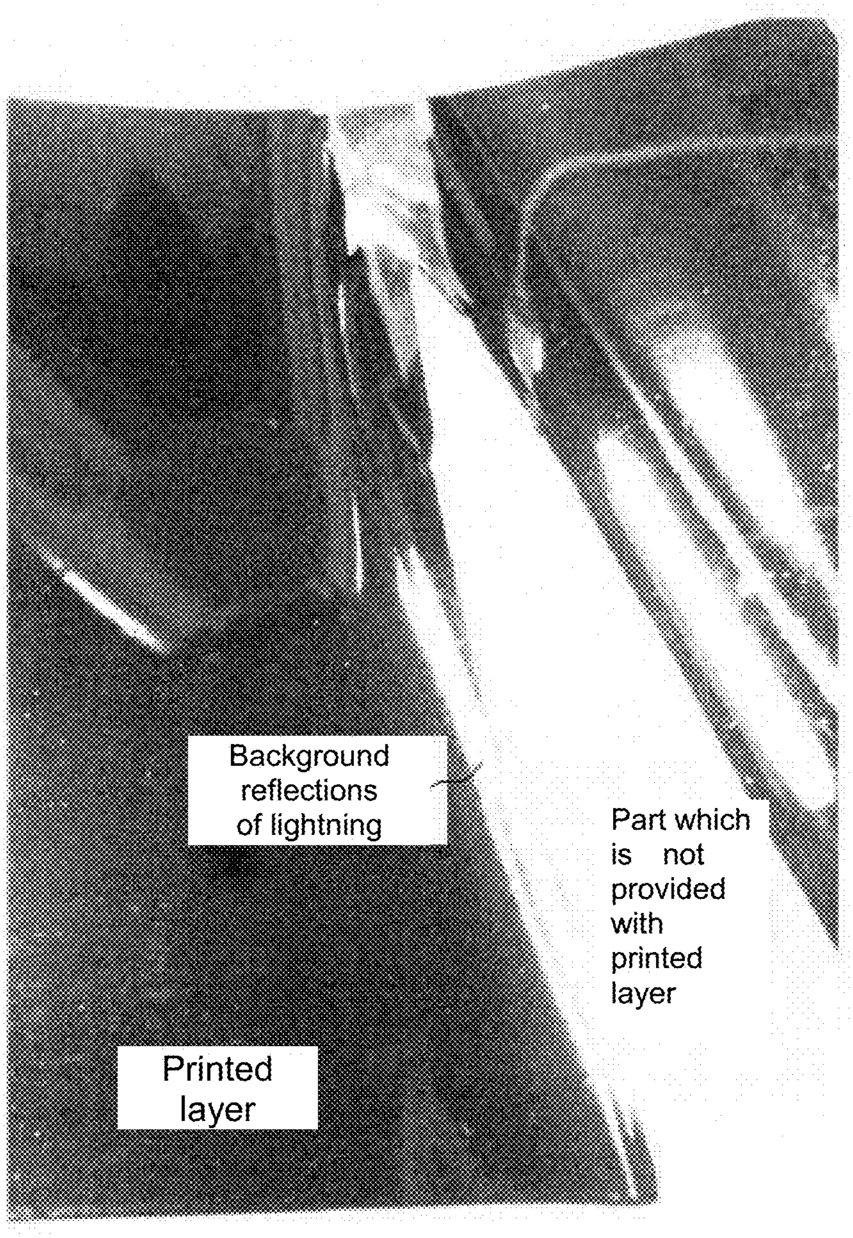

PRODUCING METHOD OF BASE MEMBER PROVIDED WITH PRINTED LAYER AND BASE MEMBER PROVIDED WITH PRINTED LAYER

TECHNICAL FIELD

The present invention relates to a producing method of a base member provided with a printed layer and the base member provided with the printed layer.

BACKGROUND ART

There is known a technique of performing screen printing on a base member having a bent portion of a curved surface shape (refer to PTL 1, for example). In a printing method of PTL 1, a screen plate is placed over the upper side of a printing target surface of the base member having the bent portion, and the screen plate is pressed by a squeegee to print the printing target surface. The screen plate is made of a mesh material formed of a metal material such as stainless steel or a resin material including nylon, polyester, and the like.

The screen plate is formed in the same shape as the bent shape of the base member in a case where a base member to be printed has a bent portion. In this case, in order to maintain a plate shape in the bent portion, the screen plate is fixed to a frame in a state where the bent portion of the screen plate is imparted with higher tension than the other portion.

However, in the bent portion where the screen plate has a large tension, when the squeegee is pressed against the base member, the amount of pressing of the screen plate by the squeegee is insufficient. In this case, a phenomenon occurs in which the screen plate does not come into contact with the printing target surface of the bent base member or the contact pressure is extremely small, and there is a possibility that printing defect in which a desired amount of ink is not formed on the printing target surface such as blur, missing or chipping may occur.

Therefore, for printing the printing target surface of the base member having the bent portion, if the flat portion and the bent portion of the base member are separated and the respective portions are separately printed, the above printing defect can be avoided. However, even in that case, a step portion is formed in the thickness of a printed layer at overlapping portions of different printing passes, and it is extremely difficult to obtain a printed layer having a uniform thickness. In addition, it is very difficult to align printing positions. Furthermore, it is disadvantageous that the printing step itself is complicated.

PRIOR ART DOCUMENT

Patent Document

[PTL 1] U.S. Pat. No. 8,561,535

SUMMARY OF THE INVENTION

Problems that the Invention is to Solve

An object of the present invention is to provide a producing method of a base member provided with a printed layer capable of forming a uniform printed layer without a printing defect on a base member having a bent portion, and the base member provided with the printed layer.

Means for Solving the Problems

The present invention has the following configuration.

(1) A producing method of a base member provided with a printed layer, the method including:

disposing a printing plate including a screen plate having an opening pattern and a frame body supporting the screen plate so that the printing plate is opposed to a printing target surface of the base member having at least one bent portion;

disposing a squeegee so as to be opposed to a plate surface of the screen plate opposite to the base member; and forming the printed layer by extruding a printing material onto the printing target surface by the squeegee via the opening pattern of the screen plate in a state where the frame body is supported so as to be relatively movable with respect to the printing target surface in a normal direction of the printing target surface.

(2) A base member provided with a printed layer, including: a printing target surface having at least one bent portion; and the printed layer formed on the bent portion of the printing target surface, in which the bent portion has a twisted structure.

(3) A base member provided with a printed layer, including: a printing target surface having at least one bent portion; and the printed layer formed on the bent portion of the printing target surface, in which the bent portion has a curved surface having two or more different radii of curvature.

Advantageous Effect of the Invention

According to the present invention, even in a case of a bent base member having a bent portion, a uniform printed layer without a printing defect can be formed.

BRIEF DESCRIPTION OF DRAWINGS

FIG. 1 is a printing apparatus of a first configuration example and a partial cross-sectional side view illustrating an aspect in which a scraper is rotated and displaced to apply and spread a printing material on a screen plate.

FIG. 2 is a perspective view schematically illustrating an appearance of a base member.

FIG. 3 is a cross-sectional view taken along line III-III of FIG. 2.

FIG. 4 is a perspective view schematically illustrating an appearance of a base member having bent portions with two or more different radii of curvature.

FIG. 5 is a cross-sectional view taken along line V-V in FIG. 4.

FIG. 6 is a cross-sectional view schematically illustrating a base member including only one bent portion.

FIG. 7 is a plan view of a mounting table.

(A) of FIG. 8 is a plan view illustrating another configuration example of the mounting table, and (B) of FIG. 8 is a schematic side view of (A) of FIG. 8.

FIG. 9 is a perspective view of a printing plate.

FIG. 10 is a perspective view of a lower side surface of the printing plate as viewed from a V direction of the printing plate illustrated in FIG. 9.

FIG. 11 is a plan view of the screen plate and a fixing member.

FIG. 12 is a cross-sectional view taken along line XII-XII of FIG. 9.

FIG. 13 is a cross-sectional view taken along line XIII-XIII of FIG. 9.

FIG. 14 is the printing apparatus of the first configuration example and a partial cross-sectional side view illustrating an aspect in which printing is performed by rotating and displacing a squeegee.

(A) to (C) of FIG. 15 are step explanatory diagrams stepwisely illustrating a step of extruding a printing material onto a printing target surface by the squeegee.

(A) and (B) of FIG. 16 are explanatory diagrams schematically illustrating an aspect in which deficiency in the amount of pressing at the bent portion is eliminated.

(A) of FIG. 17 is a partial external perspective view of the base member after printing, and (B) of FIG. 17 is a cross-sectional view taken along line XVII-XVII of (A) of FIG. 17.

FIG. 18 is a schematic top view of main portion illustrating a relationship between a screen plate and a squeegee in a printing apparatus according to a second configuration example.

FIG. 19 is a perspective view of a plate-like glass formed by a molding treatment.

FIG. 20 is an external view illustrating a vicinity of a bent portion of a glass with a printed layer according to an Inventive Example.

FIG. 21 is an external view illustrating a vicinity of a bent portion of a glass with a printed layer according to a Comparative Example.

MODE FOR CARRYING OUT THE INVENTION

Hereinafter, embodiments of the present invention will be described in detail with reference to the drawings.

First Configuration Example

A producing method of a base member of the present invention is realized by a printing apparatus as a producing apparatus of the base member described later.

FIG. 1 is a printing apparatus 100 of a first configuration example and a partial cross-sectional side view illustrating an aspect in which a scraper is rotated and displaced to apply and spread a printing material on a screen plate.

The printing apparatus 100 is provided with a mounting table 3 provided on a base 1 and on which a base member 10 having a printing target surface 11 is mounted, a printing plate 20 disposed above the mounting table 3 and having a screen plate 30, a scraper 6 moving on the printing plate 20, and a squeegee described later. Hereinafter, a wall thickness direction of the base member 10 (vertical direction in FIG. 1) is referred to as a Z direction, a direction perpendicular to the Z direction and in which the scraper 6 moves is referred to as a Y direction, and a direction orthogonal to the Z direction and the Y direction is referred to as an X direction. Hereinafter, a configuration of each part of the base member 10 and the printing apparatus 100 will be sequentially described.

(Base Member)

The base member 10 has a first main surface 11 (upper surface) as a printing target surface and a second main surface 12 (lower surface serving as a surface opposite to the printing target surface 11). In the base member 10 of the present configuration, although the first main surface 11 and the second main surface 12 are parallel to each other, these are not necessarily parallel to each other. The base member 10 is a bent base member having a three-dimensionally curved shape, and the first main surface 11 has at least one bent portion. As the bent base member, in particular, it is possible to use a bent base member including a twist as described later, or a mixture of curved surfaces having two or more different radii of curvature, or a mixture of a flat portion and a bent portion. "Bent portion" means a portion where an average radius of curvature is not infinite, and means a portion having an average radius of curvature of 5,000 mm or less. A portion having an average radius of curvature of more than 5,000 mm is referred to as "flat portion". The base member 10 may have a shape in which an entire surface of the base member 10 is curved.

The base member 10 of the present configuration has, from one end to the other end in the Y direction, a first flat surface portion 10*a* parallel to the XY plane, a bent portion 10*b* connected to the first flat surface portion 10*a* and bending in the Z direction (upward in the drawing), and a second flat surface portion 10*c* connected to the bent portion 10*b* and extending to the other end in the Y direction (rightward in the drawing). The printing target surface 11 of the base member 10 has a first flat surface portion 11*a* parallel to the XY plane, a bent portion 11*b* connected to the first flat surface portion 11*a* and bending in the Z direction (upward in the drawing), and a second flat surface portion 11*c* connected to the bent portion 11*b* and extending to the other end in the Y direction (rightward in the drawing) so as to correspond to the first flat surface portion 10*a*, the bent portion 10*b*, and the second flat surface portion 10*c*.

The radius of curvature of the bent portion 10*b* is preferably 4,000 mm or less, more preferably 3,000 mm or less, still more preferably 1,500 mm or less, and particularly preferably 1,000 mm or less. According to the present invention, even the base member 10 having a bent portion with a small radius of curvature, which conventionally cannot be uniformly printed, can be uniformly printed and a bent base member having a uniform printed layer can be obtained. The radius of curvature of the bent portion 10*b* is preferably 1 mm or more, more preferably 5 mm or more, and still more preferably 10 mm or more. If the radius of curvature of the bent portion is equal to or more than the lower limit value, aggregation of the printing material due to a surface tension can be ignored and a more uniform printed layer can be obtained.

FIG. 2 is a perspective view schematically illustrating an appearance of the twisted base member 10. FIG. 3 is a cross-sectional view taken along line III-III of FIG. 2.

Here, for the base member 10 having the first flat surface portion 10*a*, the bent portion 10*b*, and the second flat surface portion 10*c*, a dimension in the X direction is defined as a, a dimension in the Y direction is defined as b, and a wall thickness is defined as t. In addition, as illustrated in FIG. 3, a distance between both ends of the base member 10 is defined as a bending depth h. Here, the bending depth h is a distance between a line segment La connecting the two lower end portions Pa and Pb and a tangent in contact with the bent portion which is a straight line Lb parallel to the line segment La, in the cross-sectional view in the thickness direction of the base member having the bent portion.

The bending depth h of the bent portion 10*b* is preferably 1,000 mm or less, preferably 800 mm or less, more preferably 500 mm or less, and still more preferably 200 mm or less. In a case of a base member having a bending depth equal to or less than the upper limit value, even for the bent portion 10*b* having a deep bending which conventionally cannot be uniformly printed, it is possible to perform uniform printing and to obtain a base member having a uniform printed layer by using a printing method according to the present invention. Although the bending depth h of the bent portion 10*b* is not particularly limited, it is preferably 3 mm or more, more preferably 5 mm or more, still more preferably 10 mm or more, and particularly preferably 20 mm or more. For a bending depth of equal to or more than the lower limit value, the uniform printed layer can be formed according to the present invention on the base member which cannot be uniformly printed by a conventional screen printing method using a flat screen plate or the like.

The base member 10 of the present configuration has a twisted structure in which a shape of the bent portion 10*b* varies along the X direction. The term "twist" as used herein indicates a shape obtained by conditions where the radius of curvature of the bent portion 10*b* does not need to be constant and an opening angle γ which will be described later does not need to be constant. Specifically, in a case where a cross section of the base member 10 in FIG. 2 parallel to the YZ plane and perpendicular to the X axis is observed, the base member 10 has different radii of curvature and opening angles at any positions in X direction.

That is, the bent portion 11*b* of the printing target surface 11 in the base member 10 has a curved shape with a radius of curvature R1 on a forward side in FIG. 2 which is one end portion in the X direction, and has a curved shape with a radius of curvature R2 smaller than the radius of curvature R1 on a rearward side of FIG. 2 which is the other end portion in the X direction. The bent portion 11*b* has a shape in which the radius of curvature continuously varies from R1 to R2 along the X direction and has, for example, a shape obtained by bending a flat plate material while adding a twist thereto.

Regarding the radius of curvature of R1 and R2 of the bent portion 10*b* in a twisted base member as illustrated in FIGS. 2 and 3, in a case where a larger radius of curvature among R1 and R2 is used as a reference, it is preferable that the radius of curvature of the other is different by 5% or more. Particularly in such a case, a portion which cannot be printed easily occurs in normal screen printing, and the effect of the present invention is further exhibited. In a case where the larger radius of curvature among R1 and R2 is used as a reference, it is more preferable that the other radius of curvature is different by 10% or more.

In addition, as illustrated in FIG. 3, an angle formed at the intersection where extension lines of the first flat surface portion 11*a* and the second flat surface portion 11*c* of the printing target surface 11 intersect is defined as "opening angle γ". The opening angle γ of the base member 10 is preferably 45° or more and 315° or less, and more preferably 90° or more and 270° or less (except for a case of 180°).

FIG. 4 is a perspective view schematically illustrating an appearance of a base member 10A having two or more radii of curvature. FIG. 5 is a cross-sectional view taken along line V-V in FIG. 4.

In the base member 10A having two or more radii of curvature as illustrated in FIGS. 4 and 5, in a case where the radius of curvature r2 of the largest bent portion among the bent portion 10*b* is used as a reference, it is preferable that the radius of curvature r1 of the smallest bent portion is different from the radius of curvature r2 by 5% or more. Particularly in such a case, a portion which cannot be printed easily occurs in normal screen printing, and the effect of the present invention is further exhibited. In the case where the radius of curvature r2 is used as a reference, it is more preferable that the radius of curvature r1 is different by 10% or more.

In addition, in the base member 10A illustrated in FIG. 5, when a point where the line segment La connecting lower end portions Pa and Pb in the Z direction is moved in parallel and is in contact with a bottom portion of the base member 10A (curved inside surface of recessed base member) is defined as a contact point O, the opening angle γ of the base member 10A is represented by an angle formed by each line segment connecting the contact point O to Pa and Pb.

Furthermore, as illustrated in FIG. 6, as the base member 10B, the base member of the present configuration may be configured such that the printing target surface 11 consisting of only one bent portion 11*b*. In addition, when a point where a line parallel to the line segment connecting lower end portions Pa and Pb in the Z direction is in contact with a bottom portion of the base member 10B (curved inside surface of recessed base member) is defined as a contact point O, the opening angle γ of the base member 10B is represented by an angle formed by each line segment connecting the contact point O to Pa and Pb.

In the base member 10 (the same applies to 10A and 10B, hereinafter abbreviated as base member 10), at least one bent portion 11*b* may be formed on the printing target surface 11, and the position, the number, the shape, and the like of the bent portion 11*b* are not limited. For example, the bent portion 11*b* may not be a recessed curved shape in which the printing target surface 11 is a recessed surface as illustrated in FIG. 1, but may be a protruded curved shape in which the printing target surface 11 is a protruded surface.

In addition, the base member 10 may include a bent portion 11*b* having a protruded curved shape in which the printing target surface 11 of the base member 10 is at least one protruded surface and a bent portion 11*b* having a recessed curved shape in which the printing target surface 11 of the base member 10 is at least one recessed surface. For example, there is a base member 10 having a so-called "S shape" viewed from a cross section in the thickness direction of the base member 10. Even in the base member 10 having the printing target surface 11 having such the protruded curved shape and the recessed curved shape, a printed layer can be uniformly formed by preparing a printing plate so as to correspond to the printing target surface 11 and printing while adjusting the distance between the printing plate and the base member 10. The base member 10 may have not only a uniform protruded curved shape and a recessed curved shape but also a flat portion.

In any case, the X direction dimension a and the Y direction dimension b of the base member 10 are not particularly limited. It is preferable that the wall thickness t is substantially constant over the entire area of the base member 10. In addition, the wall thickness t may be partially varied or may vary over the entire area of the base member 10. As the base member 10, for example, a large base member having, for example, a of 150 mm to 1500 mm and b of 100 mm to 500 mm is suitable.

Examples of the base member 10 include a plate of glass, ceramics, resin, wood, metal or the like. Examples of glasses include crystallized glass, colored glass and the like, in addition to colorless and transparent amorphous glass.

In a case where the base member 10 is formed of glass, the wall thickness t is preferably 0.2 mm or more and 5 mm or less. If the glass has a thickness equal to or more than the lower limit value, there is an advantage that the base member 10 provided with the printed layer having both high strength and good texture can be obtained. If the glass has a thickness equal to or more than the upper limit value, it is difficult to adsorb and fix the glass on the mounting table along with the shape thereof, and the positional accuracy of printing deteriorates. In addition, the wall thickness t of the glass is more preferably 0.5 mm or more and 3 mm or less, still more preferably 0.7 mm or more and 3 mm or less, and particularly preferably 1 mm or more and 2 mm or less. The base member 10 may be subjected to surface modification treatment such as corona treatment or plasma treatment for several seconds to several minutes before forming the printed layer.

Although a glass plate as a bent base member can be used for various purposes, the glass plate can be particularly mounted on a transport machine such as a car, a train, a ship, an aircraft or the like, and can be suitably used. Glass having a bent portion, and having large size, deep bending depth h, and a twist, having two or more curved surfaces with different curvatures combined, or having a flat portion and a bent portion combined, are used for these. The present invention is extremely effective when printing a glass having such a complicated structure. In addition, when the base member 10 formed of a glass plate is used as an interior part of a transport machine such as an instrument panel, a head up display (HUD), a dashboard, a center console, a shift knob, and the like, since a uniform printed layer can be formed, high design and luxury feeling can be imparted to the interior part, and the design property of the interior of the transport machine can be improved.

(Mounting Table)

As illustrated in FIG. 1, a groove 5 having substantially the same shape as the outer peripheral shape of the base member 10 is formed on a mounting table upper surface 4. In a state where the base member 10 is mounted on the groove 5, the printing target surface 11 of the base member 10 protrudes slightly upward in the Z direction from the mounting table upper surface 4. The protrusion of the base member 10 has an effect of preventing the screen plate 30 of the printing plate 20 from touching the mounting table upper surface 4 and the like and preventing contamination by the printing material of the base member 10. The amount of protrusion of the printing target surface 11 of the base member 10 protruding from the mounting table upper surface 4 is preferably 0.1 to 1 mm, more preferably 0.1 to 0.5 mm, and still more preferably 0.1 to 0.2 mm.

The mounting table 3 is formed of carbon, resin, or the like. Examples of resins include Bakelite (registered trademark), Peak (registered trademark), vinyl chloride, Duracon (registered trademark), and the like. For these resins, a surface treatment with a conductive film for imparting conductivity or the like may be performed, or a conductivity imparting material such as carbon may be mixed. The volume resistivity of at least the mounting table upper surface 4 of the mounting table 3 is preferably $10^9$ Ωm or less, and more preferably $10^7$ Ωm to $10^8$ Ωm. When the volume resistivity is within the above range, static electricity generated at the time of printing is suppressed, and although details will be described later, plate release of the screen plate 30 from the printing target surface 11 is improved. Furthermore, the separation of the printing material such as ink is improved, and the printing accuracy can be improved without contaminating the screen plate 30. In addition, since static electricity can be reduced, a good printed layer can be formed without attracting foreign matter such as dust.

The method of fixing the base member 10 to the mounting table 3 is not limited to the above-described fitting to the groove 5, and vacuum suction may be used, or both may be used in combination.

FIG. 7 is a plan view of the mounting table 3. As illustrated in FIGS. 1 and 7, a plurality of vacuum holes 7 are opened in the groove 5 of the mounting table upper surface 4, and each vacuum hole 7 extends in the Z direction and is connected to a vacuum device (such as a vacuum pump) not illustrated. When external air is sucked through the vacuum hole 7 by the vacuum device, the base member 10 is vacuum adsorbed to the mounting table 3. The mounting table 3 illustrated in FIG. 1 illustrates a configuration example in which both fitting of the base member 10 into the groove 5 and vacuum adsorption are used in combination.

In addition, on the upper surface of the mounting table 3, a recess 9 is formed at a position where an edge portion of the base member 10 (in this configuration, one side of base member 10) passes. A second main surface 12 at the edge portion of the base member 10 faces and is disposed in an opening of the recess 9. The recess 9 is provided so as to lift the base member 10 by putting a hand, a spatula or the like into the recess 9 after printing the base member 10, and detach the base member 10 from the mounting table 3 without touching the printing target surface (first main surface) 11. Therefore, the recess 9 has a size capable of inserting a hand or a spatula, and is formed along one side of the base member 10 in this configuration.

Furthermore, an abutting member may be provided on the mounting table 3 so that the movement of the base member 10 in the XY plane or the like is regulated. As a result, an end face of the base member 10 is fixed, so that the base member 10 is unlikely to move even in the printing step, and the printing accuracy is improved.

A removal mechanism of the base member 10 of the mounting table 3 is not limited to the above example.

(A) of FIG. 8 is a plan view illustrating another configuration example of the mounting table 3, and (B) of FIG. 8 is a schematic side view of (A) of FIG. 8.

The mounting table 3A has a thrust rod 13 at the center of the mounting surface thereof. The thrust rod 13 pushes up the lower surface of the base member 10 at the top portion thereof and removes the base member 10 from the groove 5 of the mounting table upper surface 4.

According to this configuration, the handling property of the base member 10 can be further improved, and the configuration suitable for automatic conveyance or the like can be achieved.

(Printing Plate)

The printing plate 20 that performs the screen printing on the printing target surface 11 of the base member 10 is disposed on the upper side in the Z direction of the mounting table 3.

FIG. 9 is a perspective view of the printing plate 20.

The printing plate 20 is provided with a screen plate 30 having an opening pattern 31, a frame body 40 inside which the screen plate 30 is supported, and a fixing member 50 connecting the screen plate 30 and the frame body 40. The screen plate may be a combination plate in which different gauzes are stretched as an inner gauze at the center and an outer gauze on the outside.

In the printing plate 20, a screen printing plate may be prepared in accordance with the shape of the first main surface of each bent base member, such as a bent base member having a twist, a bent base member having a bent portion with two or more curvatures, and a bent base member having a flat portion and a bent portion.

The frame body 40 has a rectangular upper frame 41 extending obliquely upward in the Z direction from the left end toward the right end in the Y direction, and a plate support portion 46 protruding downward in the Z direction from the upper frame 41. The upper frame 41 has a first upper frame piece 41*a* located at the left end portion in the Y direction, a second upper frame piece 41*b* and a third upper frame piece 41*c* connected to both end portions in the X direction of the first upper frame piece 41*a* and extend to the right end portion in the Y direction, and a fourth upper frame piece 41*d* connecting the right end portions in the Y direction of the second upper frame piece 41*b* and the third upper frame piece 41*c* to each other A first side wall 42*a* extending downward in the Z direction is formed in the first upper frame piece 41*a*. In addition, a second side wall 42*b* and a third side wall 42*c* extending downward in the Z direction perpendicular to the second upper frame piece 41*b* and the third upper frame piece 41*c* are formed between the second upper frame piece 41*b* and the third upper frame piece 41*c*. Both end portions in the X direction of the first side wall 42*a* are connected to the second side wall 42*b* and the third side wall 42*c*. Lower sides 43*a*, 43*b*, and 43*c* of these first side wall 42*a*, the second side wall 42*b*, and the third side wall 42*c* have shapes along the printing target surface 11 of the base member 10 and the mounting table upper surface 4 illustrated in FIG. 1.

Furthermore, a first extension portion 44*a* and a second extension portion 44*b* are formed which are extended from the lower sides 43*b* and 43*c* in the X direction as they are on the outer side in the X direction of the second side wall 42*b* and the third side wall 42*c*. The first extension portion 44*a* is connected to a fourth side wall 45*a* formed at an end portion in the X direction opposite to the second side wall 42*b*. In addition, the second extension portion 44*b* is connected to a fifth side wall 45*b* formed at an end portion in the X direction opposite to the third side wall 42*c*. These first side wall 42*a*, the fourth side wall 45*a*, the fifth side wall 45*b*, the first extension portion 44*a*, and the second extension portion 44*b* constitute the plate support portion 46 that protrudes downward in the Z direction.

FIG. 10 is a perspective view of a lower side surface of the printing plate as viewed from a V direction of the printing plate 20 illustrated in FIG. 9.

The fixing member 50 connected to an outer peripheral portion of the screen plate 30 is disposed along the plate support portion 46 of the frame body 40 and the outer peripheral portion of the fixing member 50 is fixed to the plate support portion 46 by adhesion. In this configuration, the fixing member 50 may be omitted.

The screen plate 30 is disposed between the second side wall 42*b* and the third side wall 42*c* in a state where the plate surface is exposed. The first extension portion 44*a* and the second extension portion 44*b* are aligned with the screen plate 30 and serve as a frame that supports the fixing member 50 so as to be displaceable in the plate surface. The three-dimensionally bent shape of the screen plate 30 is maintained by this frame. The second side wall 42*b* and the third side wall 42*c* may be omitted as long as the shape of the frame is maintained.

FIG. 11 is a plan view of the screen plate 30 and the fixing member 50.

The fixing member 50 is a rectangular frame-like sheet, and an inner peripheral portion 50*a* is connected to a peripheral edge of the screen plate 30, and an outer peripheral portion 50*b* is fixed to the frame body 40 with an adhesive.

The screen plate 30 is preferably configured using a metal material. This is because a high tensile strength is required to maintain the bent shape of the bent portion 30*b* of the screen plate 30 only by a tension of the screen plate 30. Examples of the metal materials include stainless steel and the like. Furthermore, the screen plate 30 is preferably configured using a metal material on which a coating is formed. This is because the tensile strength can be enhanced more than that of the screen plate 30 formed of only the metal material. Examples of the coatings include a metal coating having corrosion resistance and liquid repellency such as nickel, a fluororesin coating, and the like, and the metal coating having corrosion resistance and liquid repellency is preferable.

In addition, the fixing member 50 is preferably formed of a resin material or a metal material having a larger elongation percentage than that of the screen plate 30. That is, an extension strength of the fixing member 50 is smaller than the extension strength of the screen plate 30. Examples of the resin materials include Tetoron (registered trademark), nylon, polyester and the like. Examples of the metal materials include stainless steel and the like. The elongation percentage of the fixing member 50 is large, so that the screen plate 30 can be significantly displaced from the original shape during printing. In addition, an interval S between the screen plate 30 and the printing target surface 11 of the base member 10 can be set large enough to absorb errors in processing and molding accuracy of the frame body 40, the base member 10, and the mounting table 3.

FIG. 12 is a cross-sectional view taken along line XII-XII of FIG. 9. FIG. 13 is a cross-sectional view taken along line XIII-XIII of FIG. 9.

The bent portion 30*b* of the screen plate 30 has a radius of curvature varying along the X direction so that the radius of curvature of one end portion and the other end portion in the X direction illustrated in FIGS. 12 and 13 become R1 and R2. In the illustrated example, the radius of curvature of the lower surface (surface facing the printing target surface 11) of the screen plate 30 is illustrated, which is because the thickness of the screen plate 30 is exaggerated. The actual plate thickness is very thin, and each radius of curvature of the front and rear surfaces of the screen plate 30 are substantially the same as each other.

As illustrated in FIG. 1, the printing plate 20 having the above-described configuration is disposed above the mounting table 3. On the left end side in the drawing of the base 1 on which the mounting table 3 is provided, a support rod 55 is erected in the Z direction. In addition, on the right end side in the drawing of the base 1, a pair of air cylinders 56 having a piston 56*a* driven to move up and down in the Z direction is disposed with the mounting table 3 interposed therebetween.

A clamp 57 is fixed to the support rod 55, and the upper and lower surfaces of the first upper frame piece 41*a* are clamped by the clamp 57. The clamp 57 is supported so as to be rotatable on the YZ plane around a connection point P to the support rod 55.

The piston 56*a* of the pair of air cylinders 56 supports the second upper frame piece 41*b* and the third upper frame piece 41*c* of the upper frame 41 of the printing plate 20 from below. The air cylinder 56 functions as a height adjusting mechanism that adjusts the height of the printing plate 20 (screen plate 30, frame body 40, and fixing member 50) and adjusts the interval S between the screen plate 30 and the base member 10.

After printing by the screen plate 30, the printing plate 20 can be retracted from the printing position by rotating the printing plate 20 in a direction (counterclockwise in the drawing) away from the base member 10 around the connection point P. After moving the printing plate 20 to the retracted position, the printed base member 10 is removed from the mounting table 3, another base member 10 to be printed next is set on the mounting table 3, and the printing plate 20 is returned again to the printing position to complete the next printing preparation.

The retracting operation of the printing plate 20 may be performed by a lifting operation by a lifting mechanism (not illustrated) other than the above-described rotating mechanism.

Here, the screen plate 30 will be described in more detail. The screen plate 30 is fixed to the inner circumferential side of the frame body 40 and has a shape corresponding to the printing target surface 11 of the base member 10 and the mounting table upper surface 4 by being aligned along the first extension portion 44*a* and the second extension portion 44*b*. That is, the screen plate 30 is spaced apart from the printing target surface 11 of the base member 10 and the mounting table upper surface 4 at a substantially constant interval S, and is disposed in a plane in which the printing target surface 11 of the base member 10 and the mounting table upper surface 4 is moved in parallel in the Z direction (may be disposed in a plane inclined after the movement in parallel). That is, the surface shape of the screen plate 30 has substantially the same shape as the printing target surface 11 and the mounting table upper surface 4.

In addition, the screen plate 30 has similar shape to the base member 10 has the first flat surface portion 10*a*, the bent portion 10*b*, and the second flat surface portion 10*c*. That is, as illustrated in FIGS. 12 and 13, the screen plate 30 has a first flat surface portion 30*a* parallel to the XY plane, a bent portion 30*b* connected to the first flat surface portion 30*a* and extending obliquely upward in the Z direction toward the right end portion in the Y direction, and a second flat surface portion 30*c* connected to the bent portion 30*b* and extending obliquely upward in the Z direction toward the right end portion in the Y direction. The interval S between the screen plate 30, and the printing target surface 11 and the mounting table upper surface 4 may not be necessarily constant. In addition, the shapes (including curved surface shapes) of the screen plate 30, and the printing target surface 11 and the mounting table upper surface 4 may not be the same shape as each other. In a case where the entire surface of the base member 10 has a curved shape, the screen plate 30 also has a curved shape over the entire surface.

The screen plate 30 has a plurality of opening patterns 31 through which ink passes during printing. As illustrated in FIG. 11 as an example, the opening pattern 31 is formed over the regions of the first flat surface portion 30*a*, the bent portion 30*b*, and the second flat surface portion 30*c*. The position at which the opening pattern 31 is provided, the shape of the opening pattern 31, or the like are not particularly limited and are arbitrary.

The screen plate 30 is fixed to the frame body 40 via the fixing member 50. More specifically, the fixing member 50 is connected to the peripheral edge of the screen plate 30 with an adhesive or the like. Similar to the screen plate 30, the fixing member 50 is disposed with a substantially constant interval S over the printing target surface 11 and the mounting table upper surface 4. That is, the fixing member 50 has substantially the same shape as the shapes (including curved surface shapes) of the printing target surface 11 and the mounting table upper surface 4.

The outer peripheral portion 50*b* of the fixing member 50 is fixed to the frame body 40 with an adhesive or the like. More specifically, in the outer peripheral portion 50*b* of the fixing member 50, the end portion rearward side in the Y direction in FIG. 10 is fixed at a position offset by a predetermined distance from the end portion in the Y direction on the lower side surface (upper side in the drawing) of the first upper frame piece 41*a*. The end portion forward side in the Y direction of the fixing member 50 is fixed to the end portion in the Y direction in the lower side surface (upper side in the drawing) of the fourth upper frame piece 41*d*. Both end portions in the X direction of the fixing member 50 are fixed to the outer end portions in the X direction of the first extension portion 44*a* and the second extension portion 44*b*.

The interval S between the fixing member 50, and the printing target surface 11 and the mounting table upper surface 4 may not be constant. In addition, the shapes (including curved surface shapes) of the fixing member 50, and the printing target surface 11 and the mounting table upper surface 4 may not be the same shape as each other.

(Scraper and Squeegee)

As illustrated in FIG. 1, the printing apparatus 100 is provided with a scraper 6 above the screen plate 30 in the Z direction. In addition, as illustrated in FIG. 14, the printing apparatus 100 is provided with a squeegee 8 that moves in a direction opposite to the moving direction of the scraper 6 and prints while pressing the screen plate 30.

In the scraper 6 illustrated in FIG. 1, the printing material is applied and spread on the upper surface of the screen plate 30, and the opening pattern 31 (refer to FIG. 11) is filled with the printing material. The squeegee 8 illustrated in FIG. 14 is rotated and displaced while pressing the upper surface of the screen plate 30, thereby extruding the printing material filled in the opening pattern 31 (refer to FIG. 11), and transferring the pattern to the printing target surface 11 of the base member 10.

The scraper 6 is pressed against the screen plate 30 at a contact angle α which is formed at the forward portion on the screen plate 30 in the traveling direction and the squeegee 8 is pressed against the screen plate 30 at a contact angle β which is an acute angle formed at the forward portion on the screen plate 30 in the traveling direction. These scraper 6 and the squeegee 8 are individually driven. Here, the range of the contact angle α is preferably from 60 to 120 degrees, more preferably from 80 to 100 degrees, and may be fixed at substantially 90 degrees. By setting the range of the contact angle α to 60 to 120 degrees, a printed layer having uniform thickness and good linearity can be printed.

The printing apparatus 100 performs a step of applying and spreading the printing material by rotating and displacing the scraper 6 in a state where the printing plate 20 (screen plate 30, fixing member 50, and frame body 40), the base member 10, and the mounting table 3 are fixed without being displaced. In addition, similarly, the squeegee 8 is rotated and displaced to perform a step of extruding the printing material. By performing the step of applying and spreading before the step of extruding, the printing material is uniformly formed on the printing target surface 11 of the base member 10.

Although not illustrated, the scraper 6 and the squeegee 8 are connected to a scraper drive mechanism and a squeegee drive mechanism having similar configuration to each other. That is, each drive mechanism is provided with a rotation mechanism that rotationally drives the shaft body that supports the scraper 6 and the squeegee 8, and a movement mechanism that moves the shaft body in the YZ plane. Any mechanism such as a mechanism for rotating and moving the scraper 6 and the squeegee 8 by a motor drive may be used as the rotation mechanism and the movement mechanism.

(Printing Procedure)

The printing apparatus 100 described above prints the printing material on the printing target surface 11 of the base member 10 by the following procedure.

First, in a state where one end of the printing plate 20 is clamped by the clamp 57, the printing plate 20 is rotated counterclockwise around the connection point P from the state illustrated in FIG. 1, and the printing plate 20 is retracted from the mounting table 3.

Next, the base member 10 is fitted in the groove 5 of the mounting table 3 and placed. Here, an abutting pin (not illustrated) may be provided on the mounting table 3, and the positioning of the base member 10 may be performed. The external air is sucked through the vacuum hole 7 by a vacuum pump (not illustrated) to vacuum-adsorb the base member 10 in the groove 5.

After setting the base member 10 on the mounting table 3 as described above, the retracted printing plate 20 is rotated in the clockwise direction around the connection point P until the lower surfaces of the second upper frame piece 41*b* and the third upper frame piece 41*c* abut against the upper surface of the piston 56*a* of the air cylinder 56. As a result, an interval S is formed between the printing target surface 11 of the base member 10 and the screen plate 30.

The scraper 6 illustrated in FIG. 1 is moved from the second flat surface portion 30*c* on the right side of the screen plate 30 in FIG. 1 through the bent portion 30*b* to a vicinity of the connection portion with the fixing member 50 at the left end portion of the first flat surface portion 30*a*. At this time, the printing material is supplied to the upstream side in the moving direction of the scraper 6, and the printing material is applied and spread on the entire screen plate 30 by the scraper 6.

In the step of applying and spreading the printing material, it is preferable to rotate and displace the scraper 6 so that the contact angle α of the scraper 6 with respect to the upper surface of the screen plate 30 is constant. As a result, the printing material is uniformly applied and spread over the entire screen plate 30. In addition, it is preferable to rotate and displace the scraper 6 so that a pressing force of the scraper 6 on the upper surface of the screen plate 30 is constant. As a result, it possible to uniformly apply and spread the printing material.

Next, the squeegee 8 illustrated in FIG. 14 is moved from the first flat surface portion 30*a* on the left side of the screen plate 30 through the bent portion 30*b* to the vicinity of the connection portion with the fixing member 50 at the right end portion of the second flat surface portion 30*c*.

In the step of extruding the printing material onto the printing target surface 11 by the squeegee 8, the squeegee 8 is rotated and displaced so that the contact angle β formed by the printing target surface 11 and a tip portion of the squeegee 8 is constant. (A) to (C) of FIG. 15 illustrate the step of extruding using a squeegee 8.

In the normal state where the screen plate 30 is not pressed by the scraper 6 or the squeegee 8, the tension in the bent portion 30*b* is larger than that in the first flat surface portion 30*a* and the second flat surface portion 30*c*. This is because in order to maintain the curved surface shape of the screen plate 30, particularly in the bent portion 30*b*, the screen plate is fixed to the frame body 40 in a strongly pulled state. However, in that case, the amount of pressing of the squeegee 8 generated in the screen plate 30 varies in a case where the squeegee 8 moves on the first flat surface portion 30*a* of the screen plate 30 as illustrated in (A) of FIG. 15 and where the squeegee 8 moves on the second flat surface portion 30*c* of the screen plate 30 as illustrated in (C) of FIG. 15, and in a case where the squeegee 8 moves on the bent portion 30*b* of the screen plate 30 as illustrated in (B) of FIG. 15.

That is, although an appropriate amount of pressing on the base member 10 can be maintained in the first flat surface portion 30*a* and the second flat surface portion 30*c*, since the tension of the screen plate 30 in the bent portion 30*b* is larger than that in the first flat surface portion 30*a* and the second flat surface portion 30*c*, the amount of pressing of the squeegee 8 is insufficient in the bent portion 30*b*. In order to eliminate insufficient pressing of the squeegee 8, the air cylinder 56 is driven as illustrated in (B) of FIG. 15 and the interval S between the screen plate 30 and the printing target surface 11 of the base member 10 is shortened by lowering the piston 56*a*.

(A) and (B) of FIG. 16 are explanatory diagrams schematically illustrating an aspect in which deficiency in the amount of pressing at the bent portion 30*b* is eliminated.

Although the illustration is omitted of the screen plate 30 being pressed into the base member 10 side in each of the above drawings, the state where the screen plate 30 is pressed by the squeegee 8, which is close to the actual state is illustrated in (A) and (B) of FIG. 16. That is, although not illustrated in FIGS. 14 and 15, actually, in the screen plate 30 pressed by the squeegee 8, the screen plate 30 relatively moves with respect to the frame body 40 and is displaced downward in the Z direction.

As illustrated in (A) of FIG. 16, when the squeegee 8 passes through the bent portion 30*b*, since the screen plate 30 has a high tension, pressing of the screen plate 30 by the squeegee 8 does not sufficiently work, and as a result, a lift of ΔS occurs. Therefore, the printing plate 20 is lowered by the air cylinder 56 so as to cancel at least the lift ΔS. Here, the air cylinder 56 is set to shrink only in a case where a certain pressing force or more is applied to the air cylinder 56. As a result, as illustrated in (B) of FIG. 16, the bent portion 30*b* of the screen plate 30 of the lowered printing plate 20 overlaps the bent portion 11*b* of the printing target surface of the base member 10, and printing according to the opening pattern of the screen plate 30 can be reliably performed on the bent portion 11*b* of the printing target surface.

As a result, when the squeegee 8 passes through the bent portion 30*b* of the screen plate 30, the printing material is uniformly pushed out from the screen plate 30, and the printing target surface 11 can be uniformly printed.

The lift ΔS illustrated in (A) and (B) of FIG. 16 and the descent amount of the printing plate 20 are merely examples, and are appropriately changed according to the material and tension of the screen plate 30, pressing force of the squeegee 8, or the like.

In addition, although cases where the printing target surface is fixed and the printing plate 20 moves are illustrated in (A) and (B) of FIG. 16, the printing plate 20 may be fixed and the printing target surface may move, and the printing target surface 11 and printing plate 20 may move separately.

By the above operation, the pressing force of the squeegee 8 against the screen plate 30 can be made substantially constant between the flat portion and the bent portion. The printing material is surely transferred to the printing target surface 11 of the base member 10 through the opening pattern 31 of the screen plate 30 illustrated in FIG. 11. As a result, the printing material is uniformly printed on the printing target surface 11 of the base member 10, and the printed layer of a desired pattern can be uniformly formed.

The scraper 6 in the step of applying and spreading may or may not be moved relative to the printing plate 20, the base member 10, and the mounting table 3. In the case of relative movement, the method of relative movement is not limited. Even in a case where any method is applied, the point that the contact angle α of the scraper 6 with respect to the upper surface of the screen plate 30 is made constant and the point that the pressing force of the scraper 6 against the upper surface of the screen plate 30 is made constant are the same as each other. Structurally, it is difficult to make the contact angle α and the pressing force completely constant, allowing some change. It is preferable to control so that the contact angle α and the pressing force change by within ±30% with reference to the desired contact angle α and the pressing force.

In addition, similarly in the step of extruding, the method of moving the squeegee 8 relative to the printing plate 20, the base member 10, and the mounting table 3 is not limited. Even in a case where any method is applied, the point that the contact angle β of the squeegee 8 with respect to the upper surface of the screen plate 30 is made constant and the point that the pressing force of the squeegee 8 against the upper surface of the screen plate 30 is made constant are the same as each other. Structurally, it is difficult to make the contact angle β and the pressing force completely constant, allowing some change. It is preferable to control so that the contact angle β and the pressing force change by within ±30% with reference to the desired contact angle β and the pressing force.

In the screen plate 30 of the present configuration, the tensile strength of the fixing member 50 is set to be smaller than the tensile strength of the screen plate 30 by appropriately setting the materials, the areas, and the like of the fixing member 50 and the screen plate 30. More specifically, the tensile strength of the fixing member 50 is preferably ⅘ times or less, more preferably ⅗ times or less, and still more preferably ⅕ times or less of the tensile strength of the screen plate 30. As a result, the screen plate 30 is fixed so as to be movable relative to the frame body 40. The tensile strength of the fixing member 50 formed of a resin material such as nylon or polyester is approximately 400 to 800 $N/mm^2$. The tensile strength of the screen plate 30 formed of a metal material such as stainless steel is approximately 1,000 to 4,000 $N/mm^2$.

In the printing plate 20 of the present configuration, the interval S between the first flat surface portion 30*a* and the second flat surface portion 30*c* of the screen plate 30 and the printing target surface 11 is preferably 0.5 mm or more, and more preferably 2 mm or more. In a case where the interval S is 0.5 mm or more, the plate release is improved. In addition, the interval S is preferably 15 mm or less, and more preferably 10 mm or less. In a case where the interval S is 15 mm or less, the screen plate 30 can be pressed by the squeegee 8, so that the printing is easily performed and the plate release is improved. In addition, the printing apparatus 100 of the present configuration is suitable for a case of printing on the base member 10 which is difficult to mold after printing, and especially for a case of using a glass plate as the base member 10. In a case where a thermoplastic resin such as acrylic is used as the base member 10, it is possible to form a bent portion or the like after printing on a flat plate-like resin. This is because the molding temperature is relatively low, and the printed layer obtained by printing is unlikely to be damaged. On the other hand, in the case of using the base member 10 having a high molding temperature such as glass, when a bent portion or the like is formed after printing on a flat plate-like glass plate, the printed layer is damaged because the formed printed layer is exposed to a high temperature. From the above, it is particularly advantageous to apply the printing apparatus 100 of the present configuration to the base member 10 which is required to be printed after forming the bent portion or the like.

The printing apparatus 100 of the present configuration is particularly excellent in that printing can be performed on the base member 10 including at least one bent portion 11*b* on the printing target surface 11, and including the printing target surface having at least one twist, two or more curved surfaces having different radii of curvature combined, at least one plane and at least one curved surface combined, or a combination shape of these shapes. In a case where such a base member 10 is printed by using a flat plate-like screen plate in the related art, the base member 10 interferes with the flat plate-like screen plate, and the printed layer having a uniform thickness and excellent appearance cannot be formed. According to the present configuration, even in a base member 10 having a deep bending depth, a uniform printed layer can be formed.

In addition, the printing apparatus 100 of the present configuration is particularly excellent in that printing can be performed on a base member 10 having at least one bent portion 11*b* having a recessed curved shape on the printing target surface 11 and having a bending depth of 3 mm or more. It is difficult to uniformly print on a recessed curved portion having a bending depth of 3 mm or more in a case of printing by using a flat plate-like screen plate in the related art. However, according to the present configuration, a uniform printed layer can be formed even on the base member 10 having the deep bending depth.

(A) of FIG. 17 is a partial external perspective view of the base member 10 after printing, and (B) of FIG. 17 is a cross-sectional view taken along line XVII-XVII of (A) of FIG. 17.

The printed layer 59 printed on the printing target surface 11 of the base member 10 is formed to have a uniform thickness tp of the printed layer even at the bent portion 11*b* of the printing target surface 11. The term “uniform” as used herein means that the thickness deviation of the formed printed layer is within ±20% of the average thickness of the printed layer. The term “average thickness” as used herein means the average value of measurement results for three or more points in each curved surface measured with a film thickness gauge. In addition, the thickness deviation of the printed layer may be preferably within ±7%, and more preferably within ±5%. Even with the base member 10 having a deep bending depth, by moving the printing plate in the bent portion to narrow the interval between the screen plate and the printing target surface 11, a uniform printed layer 59 can be formed also on the bent portion.

In the case where the formed printed layer 59 is intended to shield light, an average value of an OD value of a visible light region in the printed layer 59 is preferably 3 or more. In a case where a base member having a printed layer is used as a cover glass for a display panel, the printed layer can reliably shield the light leaking from a backlight disposed on the rear surface of the display panel, and thus an effect of improving image visibility can be obtained. The average value of the OD value of a visible light region in the printed layer 59 is more preferably 4 or more, and still more preferably 5 or more.

The upper limit value of the average value of the OD value in the formed printed layer 59 is not particularly limited, and is preferably 8 or less. When the OD value exceeds the upper limit value, the thickness of the printed layer becomes thick, and a disadvantage that a void is likely to occur at the time of bonding the base member 10 with the display device due to a step of the printed layer is likely to occur.

In a case where the formed printed layer 59 is intended for selectively transmitting (semi-transmitting) a specific wavelength range, although the OD value at 550 nm is arbitrary, the transmittance distribution in the plane of the semi-transparent printed layer is preferably ±10% or less with respect to the average value measured at any three points.

In a case where the formed printed layer 59 is a semi-transparent printed layer selectively transmitting the infrared region (IR; wavelength 750 to 1400 nm), it is preferable that the transmittance at any wavelength of 900 nm or more is 70% or more.

An optical density (OD value) is an absolute value of a value expressed in common logarithm with a base 10 as the ratio of a transmitted light amount T transmitted through an object to be measured with respect to an incident light amount I of a certain light, and indicates concealing performance. For example, assuming that the incident light amount I is 1,000 and the transmitted light amount T is 1 with visible light having a wavelength of 360 to 830 nm, the OD value in this case becomes $|\mathrm{Log}_{10}(1/1000)|=3$. The OD value can be measured using a flat surface base substrate transmittance/reflectance measuring unit (trade name: LV-RTM, manufactured by Lambda Vision Co., Ltd.).

In addition, according to the present configuration, since the printed layer 59 is formed on the printing target surface 11 in one printing step, an overlapping portion of the printed layer does not occur at a portion which is easily visible at the bent portion as compared with a case where the printed layer is formed by a plurality of printing operations. Therefore, the density of the printed layer can be kept constant, and it is possible to have a configuration that is excellent in aesthetic appearance.

Second Configuration Example

Next, the printing apparatus of the second configuration example will be described.

FIG. 18 is a schematic top view of main portion illustrating a relationship between the screen plate 30 and the squeegee 8 in the printing apparatus according to the second configuration example. In the following description, the same members and parts as those illustrated in FIGS. 1 to 17 are denoted by the same reference numerals, and the description thereof will be omitted or simplified.

Here, imaginary lines L1, L2, L3 illustrated in FIG. 18 are straight lines connecting the end portions of which the normal direction perpendicular to a tangent of the printing target surface coincides in a case where both end portions in the X direction of the printing target surface at the bent portion of the base member are viewed from the side in the X direction. Therefore, on one imaginary line, it has a printing target surface in the same direction where the normal directions all coincide with each other. That is, the imaginary lines L1, L2, L3 are contact lines where the tip end portion of the squeegee 8 contacts the base member via the screen plate 30 when the squeegee 8 is rotated and moved straight. The imaginary line L1 indicates a boundary between the first flat surface portion 30*a* and the bent portion 30*b*, and the imaginary line L3 indicates a boundary between the bent portion 30*b* and the second flat surface portion 30*c*. The imaginary line L2 is an intermediate line between the imaginary lines L1 and L2. Each normal direction has the same direction on each imaginary line L1, L2, L3.

When the squeegee 8 is moved while pressing against the screen plate 30 by using the printing plate 20, the squeegee 8 is set such that a longitudinal direction of the squeegee 8 is parallel to the X direction in a region of the first flat surface portion 30*a* of the screen plate 30. When the squeegee 8 reaches the bent portion 30*b* due to the movement of the squeegee 8 in the Y direction, the squeegee 8 is inclined from a state parallel to the imaginary line L1 to gradually become parallel to the imaginary line L2 with the movement of the squeegee 8. Furthermore, when the squeegee 8 reaches the imaginary line L2 by the movement in the Y direction, the longitudinal direction of the squeegee 8 coincides with the imaginary line L2. Furthermore, when the movement of the squeegee 8 is advanced to reach the imaginary line L3, the longitudinal direction of the squeegee 8 coincides with the imaginary line L3.

That is, the squeegee 8 is continuously rotated within the XY plane illustrated in FIG. 18 as the squeegee 8 moves, so that the surface of the base member (first main surface 11) against which the tip end of the squeegee 8 is pressed via the screen plate 30 constantly faces the same normal direction. As a result, the squeegee 8 is constantly pressed in the same direction against the first main surface 11 of the base member 10 having the twisted structure. As a result, the contact angle β formed by the first main surface 11 and the tip end portion of the squeegee 8 becomes constant at any position along the X direction, the printing material is uniformly extruded to the first main surface 11, and good printing is performed. Therefore, a printed state which is uniform and excellent in aesthetic appearance can be obtained.

As described above, the squeegee 8 is connected to a squeegee drive mechanism including a motor (not illustrated) or the like, and is changed to a desired angle or position with a movement in the Y direction illustrated in FIG. 18 by the driving of the squeegee drive mechanism.

An inclination angle of the squeegee 8 from the X direction is not limited to changing continuously in accordance with the movement in the Y direction from the imaginary lines L1 to L3. The squeegee 8 may be moved in the Y direction in a state of being parallel to the imaginary line L3 from the beginning, or the squeegee 8 may be brought closer to the state parallel to the imaginary lines L2 or L3 from the state parallel to the imaginary line L1 before reaching the imaginary line L1.

The twisted structure described above is a structure where an intersection angle ε formed by the imaginary line L1 as the start line of the bent portion illustrated in FIG. 18 and one side of the end surface 10*d* of the base member 10 satisfies 0°<ε<90°.

The present invention is not limited to the above-described embodiment, it is the plan of the present invention that each of the configurations of the embodiments are combined and those skilled in the art modify and apply the configurations based on a description of the specification and a well-known technique, and those are included in the scope seeking protection.

In the printing apparatus described above, the scraper is moved on the printing plate fixed to the printing apparatus, but the present invention is not limited thereto. For example, the scraper may be used to fill the printing plate with ink at a place where there is no base member or the mounting table outside the printing apparatus.

In addition, in the above-described printing apparatus, the air cylinder is used as a driving source for relatively moving the printing plate to the printing target surface, but the present invention is not limited thereto. For example, in a case where the force from the screen plate loaded on the squeegee reaches a predetermined constant value or greater, a mechanism for bringing the printing plate close to the printing target surface by a mechanical driving method using rubber, spring material or the like may be used. In addition, a mechanical movement mechanism may be used for either or both of the printing plate and the printing target surface, and the printing plate and the printing target surface may be brought close to each other by relatively moving at the bent portion.

In addition, in the above-described printing apparatus, both the scraper and the squeegee are configured to move in the substantially horizontal direction, but the present invention is not limited thereto, and for example, the scraper and the squeegee may be configured to move in other directions such as up and down. In that case, it is possible to reduce the horizontal installation area of the producing apparatus and to perform manufacturing efficiently.

For the printing material, it is possible to use a urethane acrylic or polyester based resin material containing a pigment such as carbon black or titanium oxide for light-shielding printing or semi-transparent printing.

EXAMPLES

Next, Examples of the present invention will be described. The present invention is not limited to the following Examples. Example 1 is an Inventive Example of the present invention, and Example 2 is a Comparative Example.

A plate-like glass (Dragon Trail (registered trademark) before chemical strengthening, manufactured by Asahi Glass Co., Ltd.) having a thickness of 2 mm, a size of 540 mm×450 mm in plan view, and a main surface of a square shape was used as a base member to obtain a glass plate with a printed layer by the following procedure.

Example 1

Treatments on the glass plate were performed in the order of (1) molding treatment, (2) grinding treatment of end surface, (3) chemical strengthening treatment and alkali treatment, and (4) formation of printed layer. Specific treatments are as follows.

(1) Molding Treatment

A recessed portion was formed on the first main surface of the plate-like glass by a molding treatment in the following procedure.

First, cerium oxide polishing liquid was used for both surfaces of the plate-like glass, and polishing was performed by 3 μm each. Thereafter, the plate-like glass was washed and dried. The plate-like glass was mounted on a mold and heated to approximately 750° C. to soften the plate-like glass and to follow the mold. As illustrated in FIG. 19, by transferring the bent portion of the mold, the bent portion 63 on the first main surface 61 side of the plate-like glass was set to have a radius of curvature R1 at one end of the bent portion 63 (forward side in the drawing) of 70 mm and a radius of curvature R2 at the other end (rearward side in the drawing) of 25 mm. The plate-like glass to which the bent portion 63 was applied was gradually cooled to room temperature to obtain a plate-like glass having the bent portion 63 (hereinafter, simply referred to as "bent glass 65").

The bent glass 65 has a flat portion 67 connected to the bent portion 63. On the second main surface side 69, the size of the flat portion 67 is La1=130 mm, La2=250 mm, La3=120 mm, and La4=350 mm. The bending depth h of the bent glass 65 was 40 mm.

(2) Grinding Treatment of End Surface

C chamfering was performed over the entire circumference of the bent glass 65 with a dimension of 0.2 mm from the end surface of the glass. The chamfering was performed using a grindstone of No. 600 (manufactured by Tokyo Diamond Co., Ltd.) at a rotation speed of the grindstone of 6,500 rpm and a moving speed of the grindstone of 5,000 mm/min. As a result, an arithmetic surface roughness Ra of the end surface was 450 nm.

(3) Chemical Strengthening Treatment and Alkali Treatment

Next, the bent glass 65 was immersed in the molten salt heated to 450° C. to melt the potassium nitrate salt for 2 hours to perform chemical strengthening treatment. Thereafter, the bent glass 65 was pulled up from the molten salt and slowly cooled to room temperature in 1 hour. With the above treatment, the chemically strengthened bent glass 65 having the surface compressive stress (CS) of 730 MPa and the depth of the stress layer of 30 μm was obtained. The bent glass 65 was washed with water and then immersed in an alkaline solution (trade name: SUNWASH TL-75, manufactured by Lion Corporation) for 4 hours to perform alkali treatment.

(4) Formation of Printed Layer

On the outer peripheral portion of the first main surface 61 of the bent glass 65, a black frame-like printed layer having a width of 2 cm was formed as follows so that the outer end surface of the printed layer was formed at a position of 0.1 mm from the end surface of the glass substrate in plan view.

First, a printing plate having a shape as illustrated in FIGS. 9 to 13 was prepared. As the screen plate 30, a gauze formed of stainless steel with a mesh diameter of 28 μm and a mesh number of 325 mesh/inch was used. In addition, as the fixing member 50, a gauze formed of polyester having a mesh diameter of 35 μm and a mesh number of 355 mesh/inch was used. The shape of the screen plate 30 was fixed to the frame body 40 so as to coincide with the shape of the bent glass 65.

As the ink, a polyester urethane black ink (trade name: GLS HF20106 AGC Sumi-1, manufactured by Teikoku Printing Inks Mfg. Co., Ltd.) was used.

Ink was supplied onto the printing plate, and printing was performed on the bent glass 65. The squeegee was driven on the printing plate so that the thickness of the printed layer at the flat portion 67 of the bent glass 65 was 5 to 6 μm. When the squeegee reached a vicinity of the bent portion of the printing plate, in order to narrow the gap between the screen plate 30 and the bent glass 65, the screen plate 30 was brought close to the bent glass 65 by the air cylinder 56. By the drive of the air cylinder 56, the distance between the screen plate 30 and the bent glass 65 was controlled to around 0.5 mm, and a printed layer was formed on the bent glass 65. FIG. 20 illustrates an appearance of a vicinity of the bent portion 63 of the obtained glass with the printed layer.

As illustrated in FIG. 20, the printed layer was uniformly formed even on the bent portion 63, and distortion of the reflection lighting was reduced.

Example 2

In the same manner as in Example 1, the bent glass 65 was treated in the order of (1) molding treatment, (2) grinding treatment of end surface, (3) chemical strengthening treatment and alkali treatment, and (4) formation of printed layer, but in the formation of printed layer of (4), a printed layer was formed without using the air cylinder and without bringing the screen plate 30 close to the bent portion 63 of the bent glass 65. FIG. 21 illustrates an appearance of a vicinity of the bent portion 63 of the obtained glass with the printed layer.

As illustrated in FIG. 21, a portion where the printed layer was not printed occurred on the bent portion 63.

As described above, the following items are disclosed in the present specification.

(1) A producing method of a base member provided with a printed layer, the method including:

disposing a printing plate including a screen plate having an opening pattern and a frame body supporting the screen plate so that the printing plate is opposed to a printing target surface of the base member having at least one bent portion;

disposing a squeegee so as to be opposed to a plate surface of the screen plate opposite to the base member; and forming the printed layer by extruding a printing material onto the printing target surface by the squeegee via the opening pattern of the screen plate in a state where the frame body is supported so as to be relatively movable with respect to the printing target surface in a normal direction of the printing target surface.

According to the producing method of the base member provided with the printed layer, the squeegee extrudes the printing material onto the printing target surface via the opening pattern of the screen plate, so that it is possible to form a uniform printed layer without a printing defect on the printing target surface having the bent portion.

(2) The producing method of the base member provided with the printed layer according to (1), in which the printing plate has a bent portion.

According to the producing method of the base member provided with the printed layer, since the printing plate has the bent portion, the printed layer is more likely to be formed on the printing target surface of the base member having the bent portion with a complicated shape, and occurrence of printing defect can be suppressed.

(3) The producing method of the base member provided with the printed layer according to (2), in which the bent portion of the printing plate has a shape corresponding to the bent portion of the printing target surface.

According to the producing method of the base member provided with the printed layer, since the bent portions of the printing plate and the printing target surface have shapes corresponding to each other, it is possible to more reliably form a uniform printed layer.

(4) The producing method of the base member provided with the printed layer according to any one of (1) to (3), in which the frame body is relatively moved with respect to the printing target surface when the printing material is extruded onto the printing target surface by the squeegee.

According to the producing method of the base member provided with the printed layer, the frame is moved relative to the printing target surface, so that it is possible to change the interval S between the screen plate fixed to the frame body and the printing target surface to an appropriate interval according to a tension of the screen plate.

(5) The producing method of the base member provided with the printed layer according to any one of (1) to (4), in which the frame body is relatively moved with respect to the printing target surface when the printing material is extruded onto the bent portion of the printing target surface by the squeegee.

According to the producing method of the base member provided with the printed layer, it is possible to appropriately change the interval S between the screen plate and the printing target surface in the bent portion where the tension of the screen plate is increased.

(6) The producing method of the base member provided with the printed layer according to any one of (1) to (5), in which the bent portion of the base member has a twisted structure.

According to the producing method of the base member provided with the printed layer, a uniform printed layer can be formed even if the base member has a twisted structure and the printing target surface has a complicated curved surface shape.

(7) The producing method of the base member provided with the printed layer according to any one of (1) to (6), in which the squeegee, and the screen plate and the base member are moved relative to each other so that a contact angle of the squeegee with respect to the printing target surface is constant when the printing material is extruded onto the printing target surface.

According to the producing method of the base member provided with the printed layer, the printing material is uniformly extruded onto the printing target surface, and good printing is performed at any position along the longitudinal direction of the squeegee. Therefore, a printed state which is uniform and excellent in aesthetic appearance can be obtained.

(8) The producing method of the base member provided with the printed layer according to any one of (1) to (7), in which the printing material is applied and spread onto the screen plate by a scraper before the printing material is extruded onto the printing target surface by the squeegee.

According to the producing method of the base member provided with the printed layer, the printing material is extruded onto the printing target surface by the squeegee in a state where the printing material is uniformly applied and spread on the screen plate by the scraper, so that the uniformity of the printing state of the printing target surface can be further enhanced.

(9) The producing method of the base member provided with the printed layer according to any one of (1) to (8), in which the printing plate further includes a fixing member in which an inner peripheral portion is connected to a peripheral edge of the screen plate and an outer peripheral portion is fixed to the frame body, and in which an elongation percentage of the fixing member is larger than an elongation percentage of the screen plate, and the screen plate is supported so as to be relatively movable with respect to the frame body.

According to the producing method of the base member provided with the printed layer, the fixing member expands more than the screen plate, so that the screen plate is supported so as to be movable relative to the frame body. As a result, it is possible to bring the screen plate close to the printing target surface while suppressing the distortion of the opening pattern of the screen plate at the time of printing.

(10) The producing method of the base member provided with the printed layer according to (9), in which the fixing member is formed of a resin material.

According to the producing method of the base member provided with the printed layer, the fixing member is formed of the resin material, which is easy to expand and contract, so that the screen plate can be largely displaced from the original shape during printing. In addition, the interval between the screen plate and the printing target surface of the base member can be set large enough to absorb errors in processing and molding accuracy of the frame body, the base member, and the mounting table.

(11) The producing method of the base member provided with the printed layer according to any one of (1) to (10), in which the screen plate is formed of a metal material.

According to the producing method of the base member provided with the printed layer, since the screen plate is formed of the metal material, a high tensile strength that maintains the bent shape at the bent portion of the screen plate only by the tension of the screen plate can be obtained.

(12) The producing method of the base member provided with the printed layer according to any one of (1) to (11), in which the base member is a glass.

According to the producing method of the base member provided with the printed layer, the base member can impart high design and luxurious feeling and the like and can improve the design property.

(13) The producing method of the base member provided with the printed layer according to any one of (2) to (12), in which at least one of the bent portion of the screen plate and the base member is a recessed curved portion.

According to the producing method of the base member provided with the printed layer, even the recessed curved portion which is difficult to print in the related art can form the uniform printed layer. Here, in the case of the bent portion of the screen plate, "recessed curved portion" means that the surface of the screen plate opposite to the base member is dented, and in the case of the bent portion of the base member, "recessed curved portion" means that the printing target surface is dented.

(14) The producing method of the base member provided with the printed layer according to any one of (8) to (13), in which the scraper and the screen plate are moved relative to each other so that a contact angle of the scraper with respect to the screen plate is constant when the printing material is applied and spread onto the screen plate.

According to the producing method of the base member provided with the printed layer, it is possible to reliably spread the printing material uniformly onto the screen plate.

(15) A base member provided with a printed layer, including: a printing target surface having at least one bent portion; and the printed layer formed on the bent portion of the printing target surface, in which the bent portion has a twisted structure.

In the base member provided with the printed layer, a uniform printed layer is formed on the portion having the twisted structure of the bent portion, and is excellent in aesthetic appearance.

(16) The base member provided with the printed layer according to (15), in which the twisted structure includes portions having different radii of curvature.

In the base member provided with the printed layer, even for the base member with the twisted structure which is difficult to print in the related art, a uniform printed layer can be formed.

(17) The base member provided with the printed layer according to (15) or (16), in which the twisted structure is a structure in which an intersection angle $\varepsilon$ between an imaginary line connecting the starting points of the bent portion and one side of an end surface of the base member satisfies $0° < \varepsilon < 90°$.

In the base member provided with the printed layer, even if the bent portion is bent in a direction inclined from one side of the end surface of the base member, a uniform printed layer is formed on the bent portion.

(18) A base member provided with a printed layer, including: a printing target surface having at least one bent portion; and the printed layer formed on the bent portion of the printing target surface, in which the bent portion has a curved surface having two or more different radii of curvature.

In the base member provided with the printed layer, even for the base member having two or more different radii of curvature which is difficult to print in the related art, a uniform printed layer can be formed.

(19) The base member provided with the printed layer according to any one of (15) to (18), in which at least one of the bent portion is a recessed curved shape in which the printing target surface is dented.

In the base member provided with the printed layer, even for the recessed shape that is difficult to print, a uniform printed layer can be formed.

(20) The base member provided with the printed layer according to any one of (15) to (19), further including a protruded curved shape which is convex to the printing target surface.

In the base member provided with the printed layer, a uniform printed layer is formed on a complicated shape such as an S shape which is difficult to print.

(21) The base member provided with the printed layer according to any one of (15) to (20), further including a flat portion, in which an optical density of the printed layer is 4 or more in both of the flat portion and the bent portion.

In the base member provided with the printed layer, a printed layer capable of obtaining a high light shielding property with a light transmittance of 0.01% or less is stably formed.

(22) The base member provided with the printed layer according to any one of (15) to (21), in which a bending depth of the bent portion is 3 mm or more.

In the base member provided with the printed layer, a uniform printed layer is formed even at a bent portion having the bending depth of 3 mm or more.

(23) The base member provided with the printed layer according to any one of (15) to (22), in which a radius of curvature of the bent portion is 4,000 mm or less.

In the base member provided with the printed layer, in a case where the base member has the radius of curvature that makes printing difficult, for example as in the above range, a uniform printed layer is formed.

(24) The base member provided with the printed layer according to any one of (15) to (23), in which a distribution of a thickness of the printed layer is within 20% with respect to an average thickness of the printed layer.

In the base member provided with the printed layer, since the thickness of the printed layer is kept with high accuracy, a uniform printed layer is formed and is excellent in aesthetic appearance.

APPENDIX

As described above, the following items are also disclosed in the present specification.

<1> A producing apparatus of a base member provided with a printed layer including a printing target surface having at least one bent portion and a printed layer formed on the printing target surface, the apparatus including:

a printing plate including a screen plate with an opening pattern and a frame body supporting the screen plate and disposed to face the printing target surface; and a squeegee disposed to face a plate surface of the screen plate opposite to the base member, in which the frame body is supported so as to be relatively movable with respect to the printing target surface, and a printing material is extruded onto the printing target surface via the opening pattern of the screen plate by the squeegee.

According to the producing apparatus of the base member provided with the printed layer, the squeegee extrudes the printing material onto the printing target surface via the opening pattern of the screen plate, so that it is possible to form a uniform printed layer without a printing defect on the printing target surface having the bent portion.

The present invention is described in detail with reference to specific embodiments, but it is apparent for those skilled in the art that various changes or modifications can be added without departing from the spirit and the scope of the present invention. This application is based upon Japanese Patent Application (No. 2017-098467), filed on May 17, 2017, the contents of which are incorporated herein by reference.

DESCRIPTION OF REFERENCE NUMERALS AND SIGNS

6 scraper
8 squeegee
10 base member
10*b* bent portion
11 first main surface (printing target surface)
11*a* first flat surface portion (flat portion)
11*b* bent portion
11*c* second flat surface portion (flat portion)
20 printing plate
30 screen plate
30*b* bent portion
31 opening pattern
40 frame body
50 fixing member
56 air cylinder
56*a* piston
57 clamp
59 printed layer
100 printing apparatus
L1 imaginary line
R1, R2 radius of curvature
h bending depth
tp thickness of printed layer

The invention claimed is:

1. A base member provided with a printed layer, comprising: a printing target surface having at least one bent portion; and the printed layer formed on the bent portion of the printing target surface, wherein the bent portion has a twisted structure, wherein a distribution of a thickness of the printed layer is within 20% with respect to an average thickness of the printed layer, and wherein the twisted structure comprising a radius of curvature R1 on one side and a radius of curvature R2 on an opposite side such that the radius of curvature R2 is smaller than the radius of curvature R2 and differ by at least 5%.

2. The base member provided with the printed layer according to claim 1, wherein the twisted structure is a structure wherein an intersection angle between an imaginary line connecting the starting points of the bent portion and one side of an end surface of the base member satisfies 0.degree.<<90.degree.

3. A base member provided with a printed layer, comprising: a printing target surface having at least one bent portion; and the printed layer formed on the bent portion of the printing target surface, wherein the bent portion has a curved surface having two or more different radii of curvature, wherein a distribution of a thickness of the printed layer is within 20% with respect to an average thickness of the printed layer, and wherein the twisted structure comprising a radius of curvature R1 on one side and a radius of curvature R2 on an opposite side such that the radius of curvature R2 is smaller than the radius of curvature R2 and differ by at least 5%.

4. The base member provided with the printed layer according to claim 1, wherein at least one of the bent portion is a recessed curved shape wherein the printing target surface is dented.

5. The base member provided with the printed layer according to claim 1, further comprising a protruded curved shape which is convex to the printing target surface.

6. The base member provided with the printed layer according to claim 1, further comprising a flat portion, wherein an optical density of the printed layer is 4 or more in both of the flat portion and the bent portion.

7. The base member provided with the printed layer according to claim 1, wherein a bending depth of the bent portion is 3 mm or more.

8. The base member provided with the printed layer according to claim 1, wherein a radius of curvature of the bent portion is 4,000 mm or less.

* * * * *